(12) United States Patent
Clark et al.

(10) Patent No.: US 9,858,212 B2
(45) Date of Patent: Jan. 2, 2018

(54) PORT LOCK

(71) Applicants: Jeffery P Clark, Harvest, AL (US); Gabriel Goldstein, Wellington, FL (US)

(72) Inventors: Jeffery P Clark, Harvest, AL (US); Gabriel Goldstein, Wellington, FL (US)

(73) Assignee: Terralink Marketing Services Corporation, Inc., Harvest, AL (US)

(*) Notice: Subject to any disclaimer, the term of this patent is extended or adjusted under 35 U.S.C. 154(b) by 22 days.

(21) Appl. No.: 15/087,810

(22) Filed: Mar. 31, 2016

(65) Prior Publication Data

US 2016/0294098 A1    Oct. 6, 2016

Related U.S. Application Data

(60) Provisional application No. 62/140,742, filed on Mar. 31, 2015, provisional application No. 62/149,198, filed on Apr. 17, 2015.

(51) Int. Cl.
| | |
|---|---|
| *G08B 21/00* | (2006.01) |
| *G06F 13/10* | (2006.01) |
| *G06F 21/83* | (2013.01) |
| *H01R 13/453* | (2006.01) |

(52) U.S. Cl.
CPC ........... *G06F 13/102* (2013.01); *G06F 21/83* (2013.01); *H01R 13/4538* (2013.01)

(58) Field of Classification Search
CPC .... G06F 13/102; G06F 21/83; H01R 13/4538
USPC ....................................... 340/5.22
See application file for complete search history.

(56) References Cited

U.S. PATENT DOCUMENTS

| | | |
|---|---|---|
| 5,752,883 A | 5/1998 | Butcher et al. |
| 7,128,586 B2 | 10/2006 | Kung |
| 7,390,201 B1 | 6/2008 | Quinby et al. |
| 7,428,834 B1 | 9/2008 | Lee |
| 7,462,045 B1 | 12/2008 | Lee |
| 7,578,691 B2 | 8/2009 | Weksler et al. |
| 7,581,417 B1 | 9/2009 | Chen |
| 7,635,272 B2 | 12/2009 | Poppe |
| 7,913,527 B2 | 3/2011 | Chen |
| 7,975,089 B2 | 7/2011 | Yen et al. |

(Continued)

FOREIGN PATENT DOCUMENTS

| | | |
|---|---|---|
| CN | 203102298 | 3/2013 |
| CN | 203689527 U | 7/2014 |
| WO | WO2006090091 A1 | 8/2006 |

*Primary Examiner* — Mark Rushing
(74) *Attorney, Agent, or Firm* — Cynthia R. Wright

(57) ABSTRACT

The present invention relates to a USB port locking device comprised of a USB locking dongle that locks into a USB port and an electronic key that unlocks the USB dongle. The USB locking dongle can be manually locked into a computer even if the computer is not receiving power. The USB locking dongle contains one or more protruding barbs that engage the female connector on a USB port physically blocking access to the port. The USB locking dongle can be safely removed when a programmed electronic key is positioned along one or more key terminals located on the USB locking dongle opposite the protruding barbs. The electronic key is a specially programmed memory device such as an iButton® that can be programmed to unlock a specific USB locking dongle or set of USB locking dongles.

11 Claims, 25 Drawing Sheets

(56) References Cited

U.S. PATENT DOCUMENTS

| | | | |
|---|---|---|---|
| 2004/0032327 A1* | 2/2004 | Flick | G07C 9/00166 340/568.1 |
| 2004/0074264 A1 | 4/2004 | Kung et al. | |
| 2005/0174238 A1 | 8/2005 | Foseide | |
| 2006/0059367 A1 | 3/2006 | Yarvis | |
| 2007/0175248 A1 | 8/2007 | Wu et al. | |
| 2007/0290790 A1* | 12/2007 | Miller | G07C 9/00817 340/5.22 |
| 2010/0217972 A1 | 8/2010 | Lohiniva | |
| 2013/0067534 A1* | 3/2013 | Soffer | G06F 3/0227 726/2 |
| 2014/0130555 A1 | 5/2014 | Clark | |
| 2015/0020189 A1 | 1/2015 | Soffer | |
| 2015/0339498 A1* | 11/2015 | Ahn | G06F 21/85 726/34 |
| 2015/0340812 A1 | 11/2015 | Ahn | |

* cited by examiner

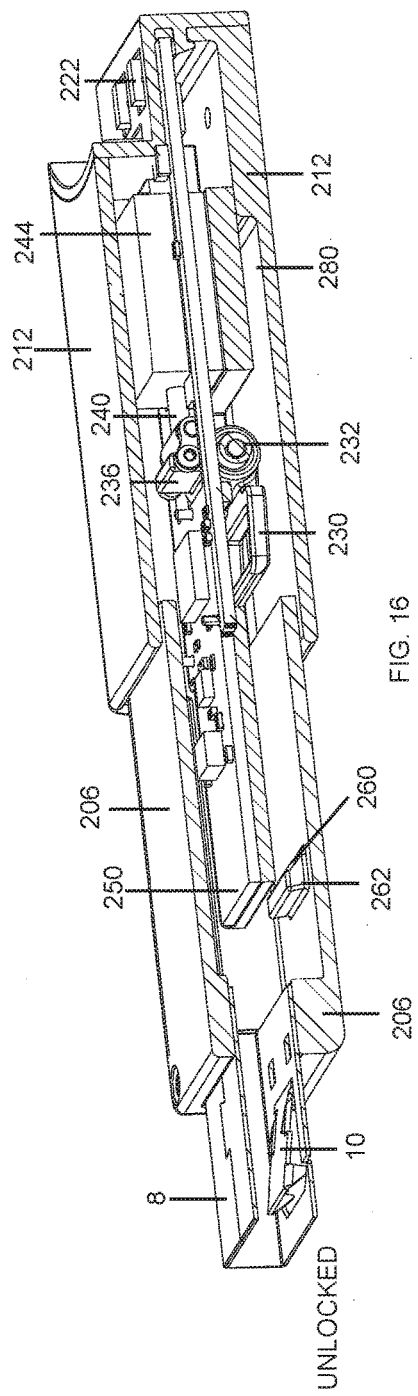
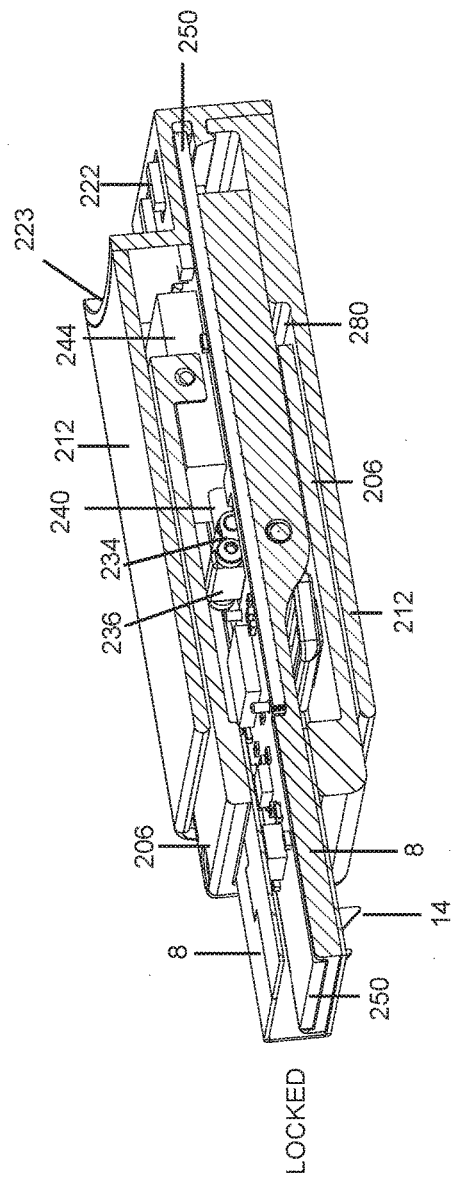

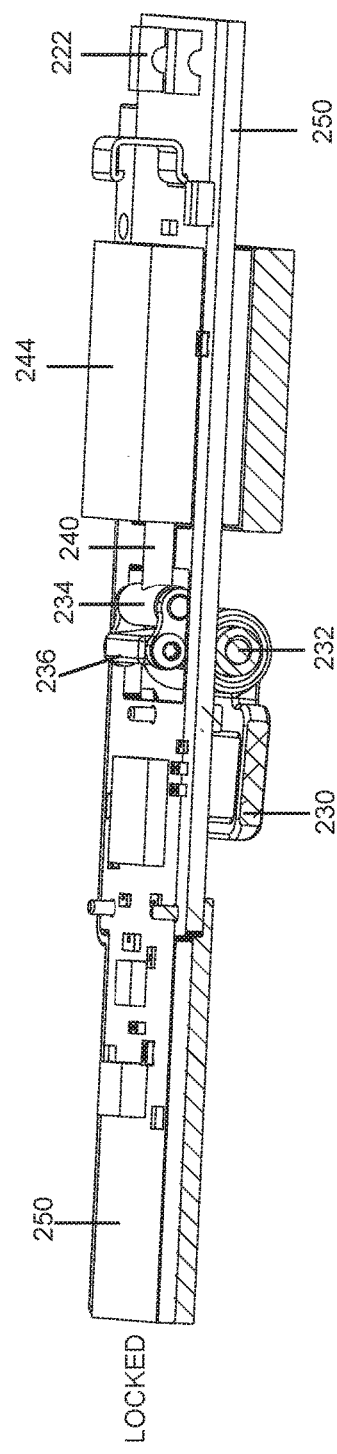
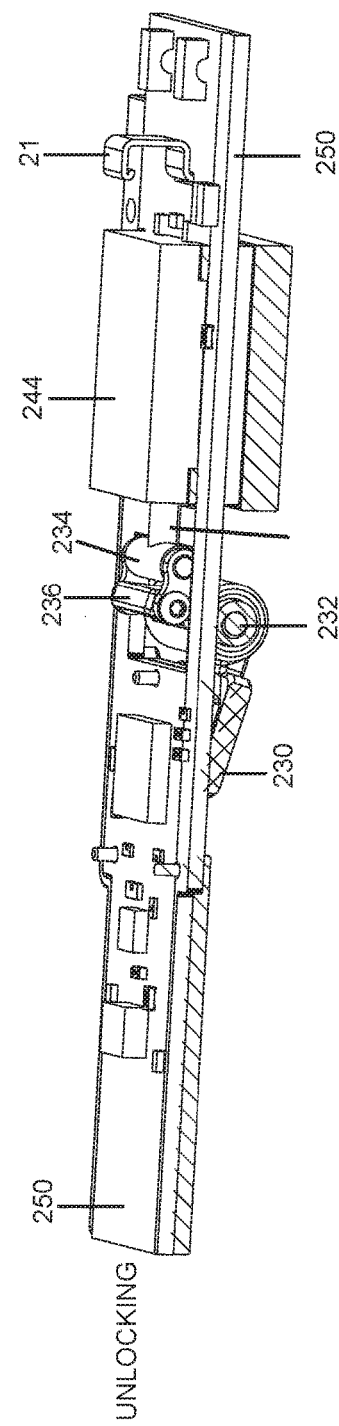
FIG. 19
FIG. 20

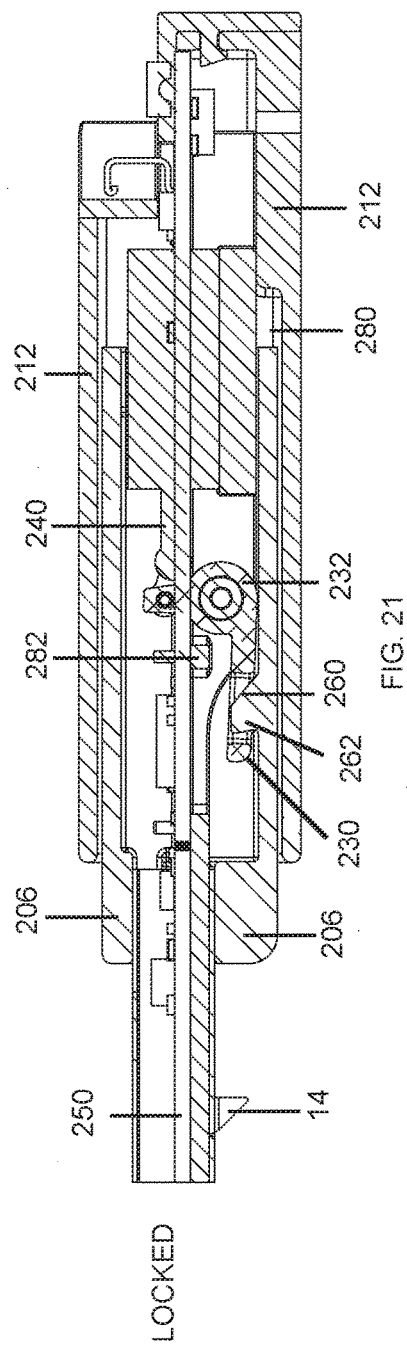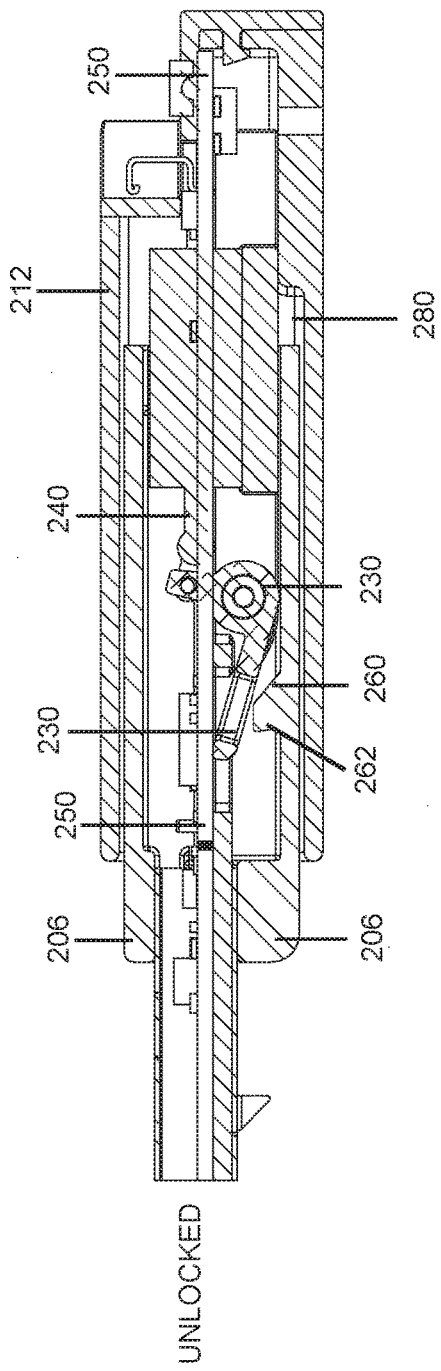

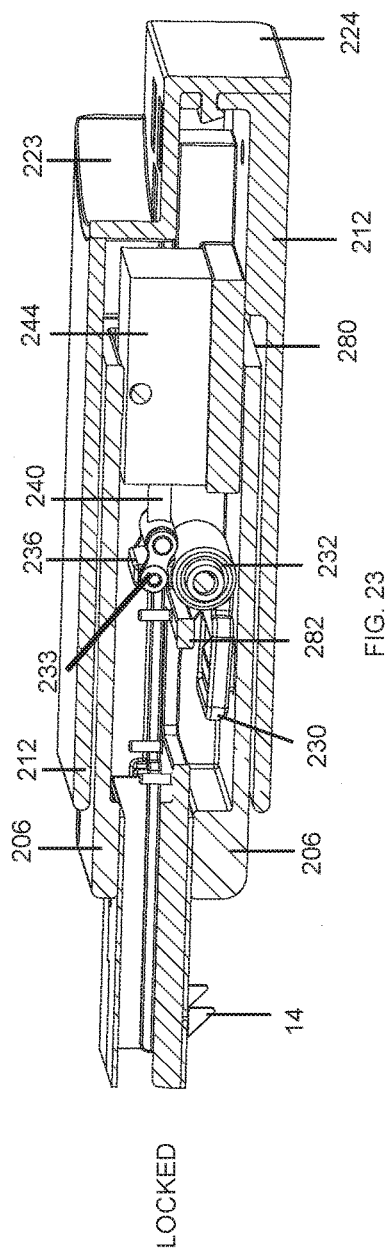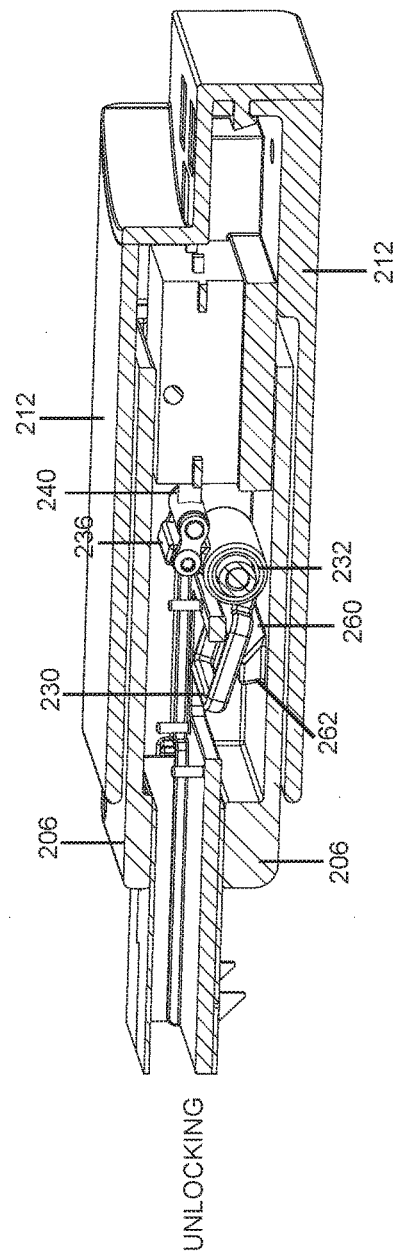
FIG. 23 LOCKED
FIG. 24 UNLOCKING

PORT LOCK

STATEMENT REGARDING PRIOR DISCLOSURES BY THE INVENTOR OR A JOINT INVENTOR

The inventors have not disclosed this invention prior to the filing of this international application for patent.

BACKGROUND OF THE INVENTION

(1) Field of the Invention

Computers are at risk of attack from viruses introduced via thumb drive and from theft of data which can be copied onto a USB thumb drive and transported by unauthorized individuals. This present invention relates to a lock for USB ports on personal computers and other electronic devices. More particularly, the present invention relates to a locking device for locking into a USB port physically blocking access to the port. This lock is both mechanical and electronic in nature. A USB dongle physically locks into the USB port and a separate electronic key device is required to electronically unlock the USB dongle.

(2) Disclosure of the Prior Art

All computers containing a USB port are at risk of attack from viruses transmitted via thumb drive. Computers used in a work environment, particularly secure environments such as government facilities, banking, and corporate offices, are all at risk of attack from viruses and malware transmitted via thumb drives, backup hard drives, cell phones and other devices that an employee or end user may plug into a USB port of the computer. In other instances, hackers and spies have been known to penetrate a computer network by first loading an infectious file onto a portable device such as a USB thumb drive, a tablet device, or a mobile phone. When an individual plugs their mobile phone or thumb drive device containing a virus into a computer that is on a network, typically via a USB port, a virus can be launched. This virus will be launched from within the computer network, allowing it to circumvent the computer's firewall. One example of this is the infection via thumb drive on the computers controlling Iran's nuclear material centrifuges with the Stuxnet worm, resulting in the elimination of approximately twenty percent of Iran's nuclear enrichment capability.

Today, large files including secret or proprietary information may be quickly and easily copied onto a USB thumb drive and the data contained within said files misappropriated or stolen. USB thumb drives are small, easily hidden, and often embedded into common items like key chains and ink pens. A data thief with access to a computer network can utilize a USB thumb drive to copy and steal data undetected.

Numerous devices are available that prevent access to a USB port. Kung (U.S. Pat. No. 7,128,586 B2) discloses a USB lock wherein a lock piece is inserted into a USB port. The lock piece inserted into the USB port functions as a plug blocking all access to the port. The lock piece remains in the USB port and can not be removed. Although this device eliminates access to the USB port, the locking device is not removable resulting in a permanent loss of access to the port.

Quinby (U.S. Pat. No. 7,390,201 B1) discloses a device to plug a USB port. The invention of Quinby comprises a plug that has at least one engagement member to partially extend through at least one aperture of the plug and lock to at least one structure within the USB connector receptacle. The Quinby device is not designed to be removed. If future use of the USB port is desired, then Quinby has an alternate embodiment that plugs the USB port but allows unfettered access to an attached port. Although the locking mechanism employed by Quinby securely blocks access to the USB port, none of the embodiments disclosed provides for removal of the USB port plug without damaging the port.

Numerous mechanical devices have disclosed physical methods of locking computer ports via USB thumb drive locks. Lee (U.S. Pat. No. 7,462,045 B1) discloses a connector lock with a plug that fits within a USB port and a mechanical key that unlocks said plug. The retaining members that actually lock the plug into the USB port protrude outward from the sides of the plug. This arrangement of the pins is easy to unlock by anyone possessing a pair of tweezers or similar device. Lee also discloses that only the correct key can unlock the plug. But, anyone with a similarly configured key could release the plug and gain access to the USB port. Additionally, it would be relatively easy to create a similarly shaped device to operate as a key to release the plug from the port.

Lee (U.S. Pat. No. 7,428,834 B1) discloses a USB port plugging device comprising a locking member that plugs the port. The locking member utilizes two barbs that are extended down into the USB port plugging the port. A cylindrical key fits into the locking member to lock and unlock the device. The key has a T-shaped extension that fits into an opening on the plug. Upon insertion and turning of the T-shaped extension, the plug is released from the USB port. Anyone having access to a similarly shaped key or object would be able to access the port. Additionally, it would not be difficult for a data thief to fashion his or her own key to unlock the plug.

Other references disclose mechanical devices that lock and block USB ports. Poppe (U.S. Pat. No. 7,635,272 B2) discloses a lock for USB ports including a locking member with retractable barbs that engage the USB port, blocking access to the port. Poppe utilizes a key of a certain shape that fits into the locking member to retract the locking barbs. Anyone having access to the key would be able to remove the port lock and access data contained on the electronic equipment. Additionally, it would be relatively simple to fashion a key of similar shape to unlock the device.

Several devices disclose electronic USB port locking devices that unlock when a numerical code is correctly entered. Wu (US 2007/0175248 A1) discloses a mechanical lock to be used on electronic devices. The locking member fits into a port and locks into position via two barbs that protrude from the sides of the device. The lock contains a set of three dials wherein a user dials the correct combination of numbers to unlock the device. Anyone with access to the code could successfully unlock the device and have access to the data contained within the electronic device. Additionally, because of the location of the locking barbs, anyone with a pair of tweezers or a similar instrument could simply insert the tweezers into the sides of the USB port and squeeze on the barbs, releasing them from engaging the sides of the USB port on the computer or electronic device. Chen (U.S. Pat. No. 7,913,527 B2 and U.S. Pat. No. 7,581,417 B1) discloses a USB port locking device wherein a combination lock is incorporated within the USB device. Chen requires a 5 number numerical code to unlock the device. The Chen device is secured into the USB port by two hooking arms that are compressed downward when the device is inserted into a USB port. Anyone with access to the combination would be able to remove the locking member and have access to the USB port.

Weksler et al. (U.S. Pat. No. 7,578,691 B2) discloses a USB port locking device wherein one or more pins of the device are engaged and disengaged in response to an electrical signal generated within the USB locking device. This electrical signal is generated when the correct password is entered into the computer (U.S. Pat. No. 7,578,691 B2). This device is easily penetrated by anyone obtaining the password.

BRIEF SUMMARY OF THE INVENTION

The USB Port Lock and Electronic Key Device comprises a USB locking dongle that is locked into a USB port and an electronic key that unlocks the USB locking dongle. The USB Port Lock and Electronic Key Device can be mechanically engaged within the USB port irrespective of whether the computer is powered on. The dongle has an external locking interface that engages at least one protruding barb with the female connector of a standard USB port socket. The dongle comprises an external lock housing that slides over the inner case. The locking blade is hard fixed to the external lock housing of the dongle. When a user manually slides the external lock housing over the inner case, a sliding member forces the protruding tabs to extend downward into the USB port. Activation of an electromagnet within the dongle unlocks the locking blade and disengages the protruding arms. The electromagnet unlocks the USB dongle in response to an electrical signal generated by an electronic key. The key can be any device that can store a plurality of encrypted data bits. One embodiment uses an iButton® as a key. An iButton® device is a computer chip enclosed within a 16 mm thick stainless steel can. Computer software is utilized to maintain key codes and program an iButton® or other memory device with a programmable security code to unlock the USB Port Lock and Electronic Key Device. A personal computer is attached to a programming station where integration and programming of each electronic key and the USB locking dongle is performed.

The present invention is superior to the prior art listed above because it incorporates both a mechanical and an electrical lock into the same locking device. Therefore, in order to release the physical lock after insertion into a USB port, the user is required to have an electronic key capable of generating an electrical signal to unlock the device. If an unauthorized user obtains or creates an electronic key, said key will be inoperable because only a key having the correctly coded electrical signal will be able to successfully unlock the USB dongle. Thus, this invention provides much greater security for devices with USB ports. If the key is lost, then a new key can be programmed to remove the locking dongle. Additionally, the present invention can be incorporated into a programming system wherein a system administrator can program and maintain security for a number of computers within a network of computers. An unauthorized user can not simply create a new key to unlock the USB dongle because only those keys programmed by the administrator will unlock the locking mechanism.

BRIEF DESCRIPTION OF THE DRAWINGS

The invention is described in detail below with reference to the appended drawings. FIGS. 1 through 10 depict an electromagnet embodiment, while FIGS. 13 through 21 depict an embodiment that includes a hook-shaped casting, FIGS. 22 through 25 are flow charts depicting the programming and electronic operation of the USB Port Lock and Electronic Key Device.

FIG. 1 illustrates a top view of an unlocked USB locking dongle angled so that the side is also depicted;

FIG. 2 illustrates a top view of a locked USB locking dongle with the inner case cut away;

FIG. 3 illustrates an internal, top view of the USB locking dongle;

FIG. 4 illustrates an internal, top view of the unlocked USB locking dongle wherein the external lock housing and inner case have been removed;

FIG. 5 illustrates a top, angled view of the USB locking dongle in an unlocked position with the external lock housing and inner case removed;

FIG. 6 illustrates a top, angled view of the USB locking dongle in a locked position with the external lock housing and inner case removed;

FIG. 7 illustrates a sectional view of the USB locking dongle in an unlocked position;

FIG. 8 depicts a top view of s locked USB locking dongle in a non-energized state with the inner case and external lock housing removed;

FIG. 9 illustrates a top view of an unlocked USB locking dongle in an energized state. The USB locking dongle is illustrated with the external lock housing and inner case removed;

FIG. 10 illustrates a top view of the USB locking dongle oriented in relation to an iButton® or similar electronic key;

FIG. 11 illustrates the configuration of the electronic mechanism of the USB locking dongle; and FIG. 12 illustrates the USB Port Lock and Electronic Key Device programming system.

FIG. 13 depicts an exterior, top angled view and FIG. 14 depicts an exterior, bottom angled view of the hook casting embodiment.

FIG. 15 depicts an exterior, side view of the hook casting embodiment with the rear of the device visible.

FIG. 16 depicts a sectional view of the hook casting embodiment in the locked position, while FIG. 17 depicts a sectional view in the unlocked position.

FIG. 18 depicts a top view of the printed circuit board included within the hook casting embodiment.

FIG. 19 depicts a top-angled view of the hook casting embodiment in the locked position with the outer casing removed. And, FIG. 20 depicts a top-angled view during the unlocking mechanism with the outer casing removed.

FIG. 21 depicts a sectional view of the hook casting embodiment in a locked position. And, FIG. 22 depicts a sectional view of the hook casting embodiment in during the unlocking mechanism.

FIG. 23 depicts a sectional, angled view of the hook casting embodiment in the locked position.

FIG. 24 depicts a sectional, angled view of the hook casting embodiment during the unlocking mechanism.

FIG. 25 depicts the hook casting removed from the USB Port Lock and Electronic Key Device device.

DETAILED DESCRIPTION OF THE INVENTION

The invention is described in detail in the following paragraphs with reference to the attached drawings. Throughout this detailed description of the invention, the disclosed embodiments and features are to be considered as examples, rather than being limitations to the invention. Modifications to particular examples within the spirit and scope of the present invention, set forth in the appended claims, will be readily apparent to one of ordinary skill in the art. Further, reference to various embodiments of the disclosed invention does not mean that all claimed embodiments or methods must include every described feature. The various disclosed embodiments and features of the invention may be used separately or together, and in any combination. Terminology used herein is given its ordinary meaning consistent with the exemplary definitions set forth below.

The present invention is directed to a USB port locking device. The USB Port Lock and Electronic Key Device comprises a dongle that physically locks into a USB port and an electronic key to unlock the dongle and release the dongle from the port. The USB Port Lock and Electronic Key Device can be installed into any computer port regardless of whether the computer is powered on. A user simply inserts the USB locking dongle into the USB port of a computer or electronic device. The user slides the external lock housing 12 over the inner case 6, manually locking the USB dongle into the port.

Figure 1:
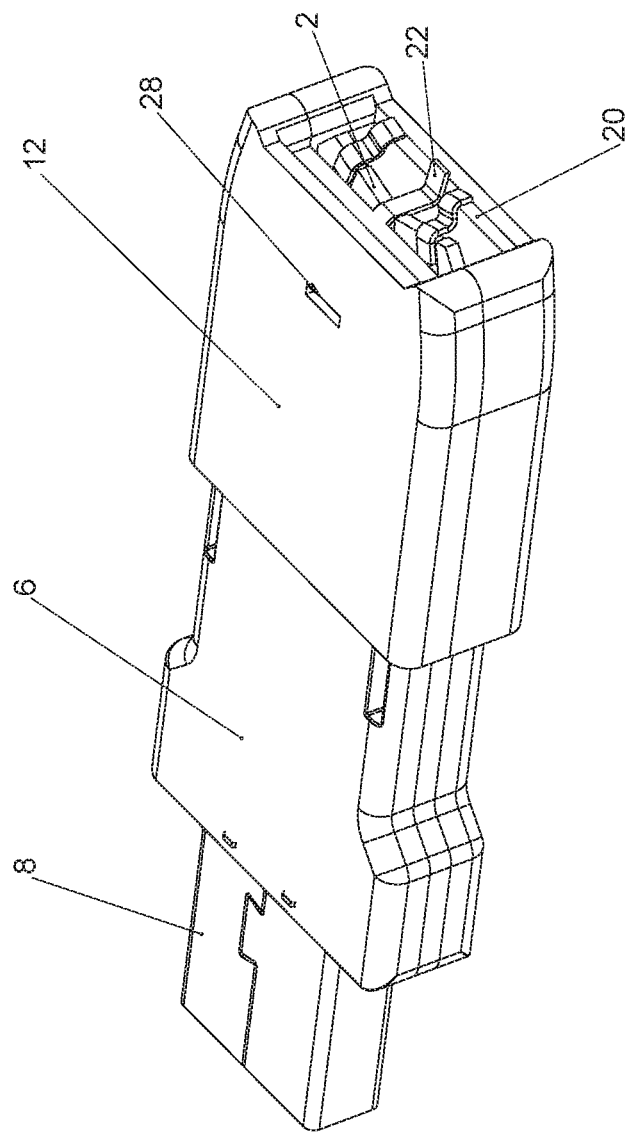

The USB dongle comprises a plug 8 that fits into the USB port, blocking access to said port, an external lock housing 12 that encloses the locking mechanism, and an interface to electronically interact with a key. FIG. 1 illustrates an angled, top view of the USB locking dongle in an unlocked position. The USB shell or plug 8 is configured to fit within a USB port. The plug 8 is composed of metal or other suitable material to mechanically plug a USB port. The external lock housing 12 mechanically slides over an inner case 6 to engage the USB Port Lock and Electronic Key Device into the USB port. Both the external lock housing 12 and the inner case 6 are composed of plastic or other suitable material that is rigid, resistant to physical impact, and cost effective to manufacture.

The USB Port Lock and Electronic Key Device is shown in an unlocked position in FIG. 1. When the USB Port Lock and Electronic Key Device is in an unlocked position the printed circuit board 2 is pushed away from the plug 8 so that the key terminals 22 are not accessible to an electronic key device because they do not extend far enough out from the USB locking dongle to make contact with said electronic key. FIG. 1 illustrates the location of the key platform 20, which provides a platform to receive a preprogrammed electronic key device to unlock the USB Port Lock and Electronic Key Device. An electronic key engages with the plurality of key terminals 22 that project from the printed circuit board 2. Three key terminals 22 are depicted in one embodiment. The number of key terminals 22 may vary depending upon what embodiment of electronic key is utilized. The key terminals 22 are soldered to the printed circuit board 2 at the end of the printed circuit board 2 near the key platform 20. This embodiment contains three key terminals 22. The electronic key transfers electronic data including a key code that is specifically programmed for unlocking a particular USB locking dongle. While an iButton® is disclosed as the preferred embodiment of the electronic key, other methods of signal transfer between a key and an electronic USB lock may also be used. Any memory device that stores a key code in nonvolatile memory and allows the transfer of data such as a security key code or similar code, may be used instead of an iButton®.

FIG. 1 illustrates the location of a LED light 28 which is positioned on the top of the external lock housing 12 in this embodiment. The LED light 28 indicates the status of the USB locking dongle. The LED light 28 comprises both a red and a green light. The solenoid 46 (shown in FIG. 2) controls the LED light 28. The LED light 28 flashes red to indicate that the USB locking dongle is locked or engaged via one or more protruding barbs 14 in the female connector of a USB port on a computer or electronic device. When the LED light 28 is flashing red, attempted removal of the USB locking dongle will severely damage the USB port making the port inoperable. The LED light 28 flashes green to indicate that neither of the protruding barbs 14 is engaged with the female connector of the USB port. When the USB Port Lock and Electronic Key Device LED light 28 is flashing green, the USB locking dongle can be safely removed from the USB port.

Figure 2:
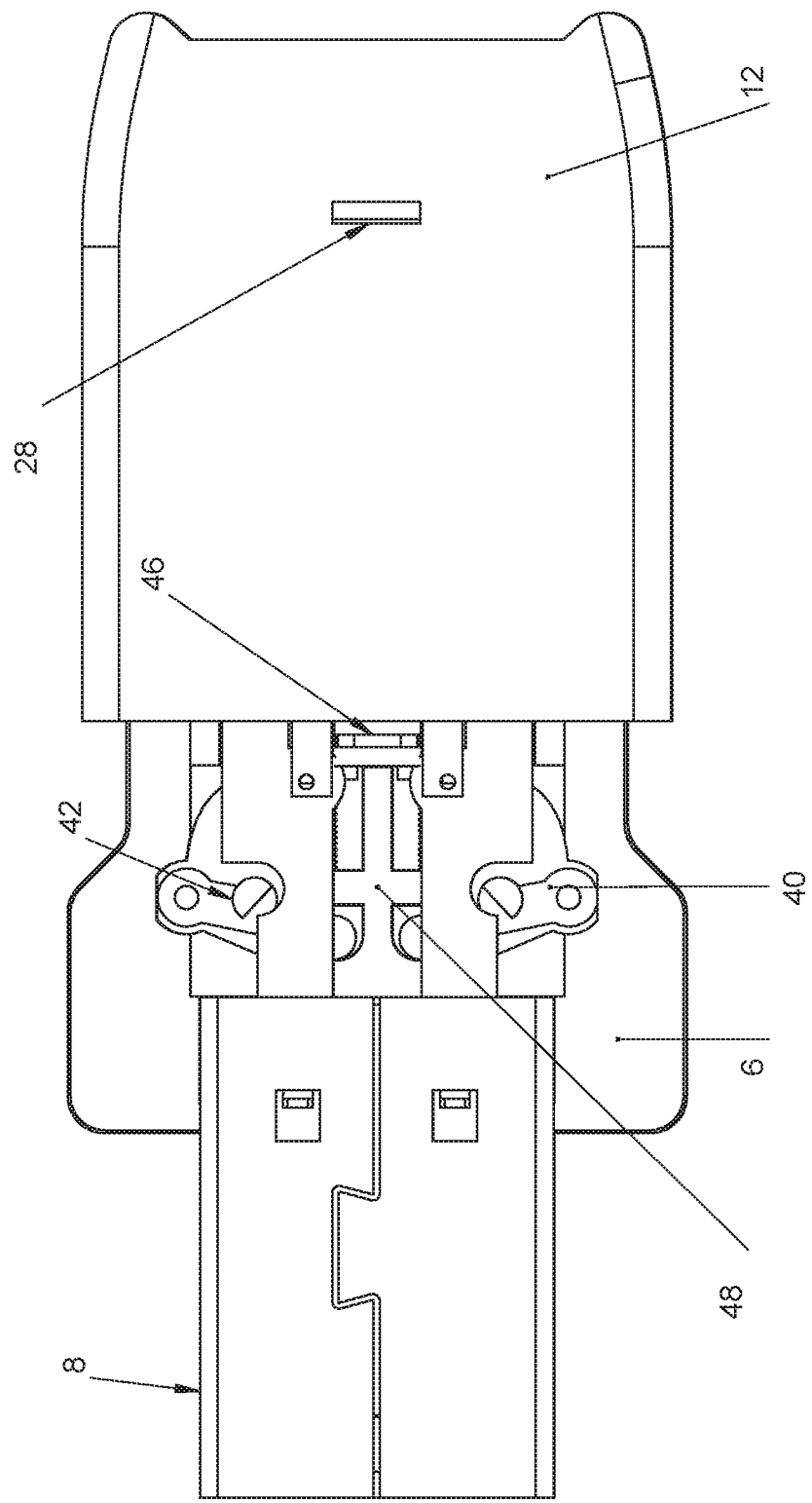

FIG. 2 illustrates a top view of a locked USB locking dongle with the inner case 6 cut away. The locking dongle operates as a plug physically blocking access to the USB port when inserted. The plug 8 is configured to fit within the USB port blocking all access to the USB port. To lock the USB locking dongle into a USB port, the user slides the external lock housing 12 over the inner case 6. When the external lock housing 12 is slid over the inner case 6, the sliding member 16 pushes the latch tab 48 towards the plug 8, the latch tab 48 movement pushes the locking arm pins 41 causing the locking arms 40 pivot pushing the locking blades 42 into two notches located on the sliding member 16. The locking procedure is performed manually without any electrical power. Thus, the USB Port Lock and Electronic Key Device can be installed in any USB port irrespective of whether the computer or electronic device containing said port is powered on.

FIG. 2 depicts the two locking arms 40 while in a locked position. The locking arms 40 are anchored to inner case 6. Locking arms 40 pivot about locking arm pins 41 to move the locking blades 42 out of a locked position unlocking the USB locking dongle. At the end of each locking arm 40 is a half-moon shaped locking blade 42. The locking blades 42 are the physical means of locking the plug 8 into the USB port. When the USB locking dongle is pushed into the computer port, the locking arms 40 move so that the locking blades 42 are positioned within a circular notch on the sliding member 16. The sliding member 16 moves within the USB locking dongle to mechanically unlock the dongle when the correct electronic key is received. The shape of the locking blades 42 prevents the sliding member 16 from moving without the presentation of the correct electronic key. Manually pulling on the USB dongle to free it from the electronic port forces the locking blades 42 against the two notches of the sliding member 16 physically preventing removal of the dongle. During the locked position, the plug 8 is extended from the external lock housing 12 at its maximum distance. FIG. 2 illustrates the location of the solenoid 46 within the external lock housing 12. The solenoid 46 powers the unlocking motion of the USB dongle when signaled. The solenoid 46 is powered by the computer or electronic device via the USB port, which provides 5 volts of power. The electromagnet 44 is positioned on the solenoid 46 so that said electromagnet is positioned in line with the lock pin 70 and the latch tab 48. The electromagnet 44 is composed of iron or a suitable material to create an electromagnet force when the solenoid 46 is energized. The latch tab 48 and lock pin 70 are composed of a ferromagnetic material such as iron, nickel, cobalt, some alloys of rare earth metals, and some naturally occurring minerals such as lodestone. The latch tab 48 is fashioned out of the same piece of metal as lock pin 70. When a correctly coded electronic key is utilized to unlock the USB locking dongle, the electromagnet 44 becomes energized by the solenoid 46, which creates a magnet charge within the electromagnet 44. This magnet charge attracts the lock pin 70 and latch tab 48 towards the electromagnet 44. The lock pin 70 and latch tab 48 move towards the electromagnet 44 via magnet attraction. The movement of the latch tab 48 causes said latch tab 48 to push into the locking arm pins 41 that are located on the locking arms 40 allowing the locking arms 40 to pivot about the locking arm pins 41. The pivoting motion of the locking arms 40 causes the movement of the locking blades 42 out of the notches located on the sliding member 16. This releases the sliding member 16 so that a user can manually move the sliding member 16 away from the plug 8, which allows the spring tab 10 to move into the inner case 6 releasing the protruding barbs 14 from the USB port.

Figure 3:
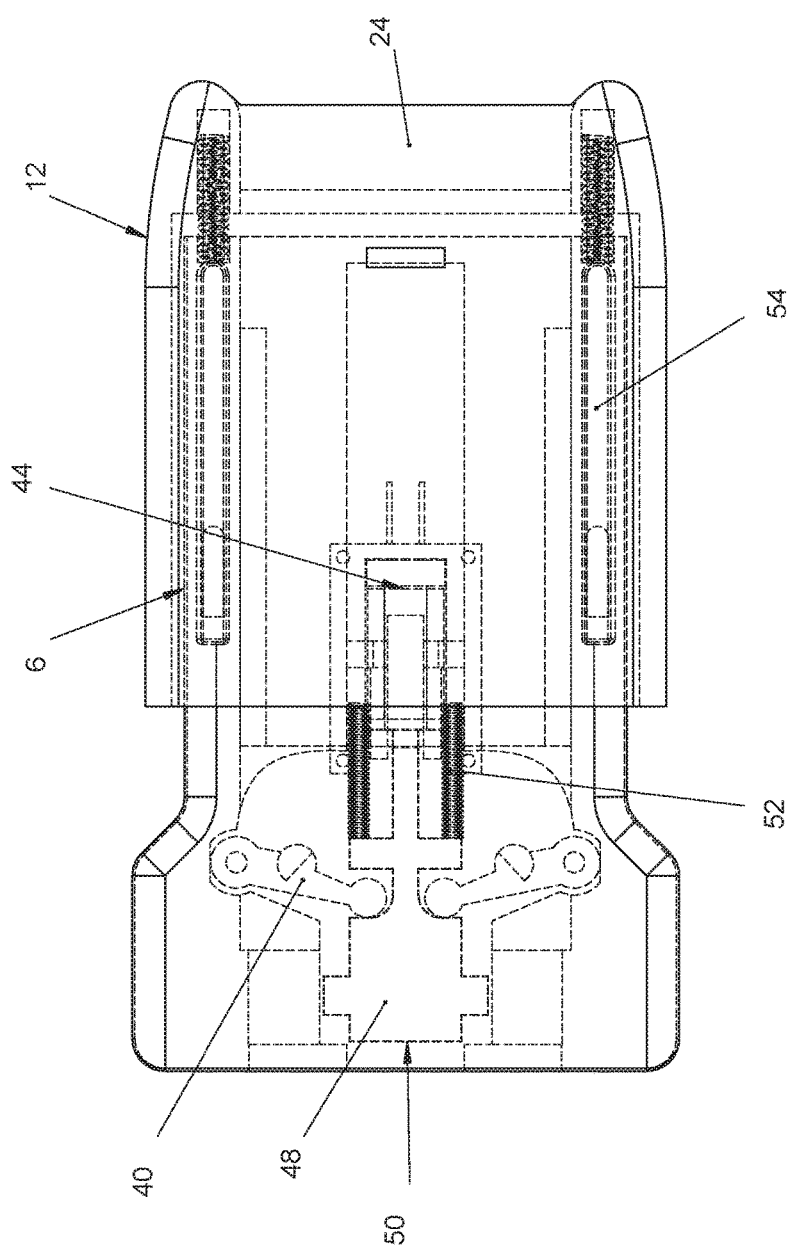

FIG. 3 depicts an internal, top view of the USB locking dongle. In this Figure, the portion of the external lock housing 12 nearest the plug 8 has been cut away. The external lock housing 12 houses the solenoid 46, the electromagnet 44, two case springs 54, and a key platform 20 to position an electronic key to unlock the dongle. Beneath the external lock housing 12 at the key end of the locking dongle are two case springs 54 that secure the external lock housing 12 to the inner case 6. Each of these case springs 54 are compression springs that anchor the external lock housing 12 to the latch tab 48. Molded within the external lock housing 12 are two spring chambers 66. The spring chambers 66 allow the two case springs 54 to coil and uncoil allowing the external lock housing 12 to move in relation to the inner case 6 while said case springs 54 maintain contact with both the external lock housing 12 and the inner case 6. Each spring chamber 66 is positioned on opposite sides of the external lock housing 12 in alignment with the inner case 6.

The electromagnet 44 is positioned on solenoid 46 towards the plug 8. Both the electromagnet 44 and the solenoid 46 are centered within the external lock housing 12. A manual release 50 abuts latch tab 48. The manual release allows for the manual removal of the USB locking dongle when said dongle is installed in a computer USB port but is not in a locked position. The solenoid 46 receives an electrical signal from the CPU 80 (shown in FIG. 4) when the correct key is positioned near the key platform 24. The solenoid 46 sends an electrical signal to the electromagnet 46, which energizes the electromagnet 44, causing the electromagnet 44 to produce a ferromagnetic charge that attracts the lock pin 70 and the latch tab 48. The magnetic attraction between the energized electromagnet 44 and the lock pin 70 powers the movement of the latch tab 48 towards the key platform 20 and away from the plug 8. The moving latch tab 48 creates the physical movement that pushes the locking arm pins 41 causing the locking arms 40 to pivot about the locking arm pins 41 releasing the locking blades 42. Once the locking blades 42 are released from the sliding member 16 notches, the USB locking dongle may be manually removed from the USB port. FIG. 3 shows the position of the latch tab 48 relative to the two locking arms 40 and the two locking blades 42.

Anchoring latch tab 48 to the inner case 6 are two latch tab springs 52. Each latch tab spring 52 is a compression spring. Each latch tab spring 52 is positioned on opposite sides of the outer most points on a "T"-shaped perpendicular extension of the latch tab 48.

Figure 4:
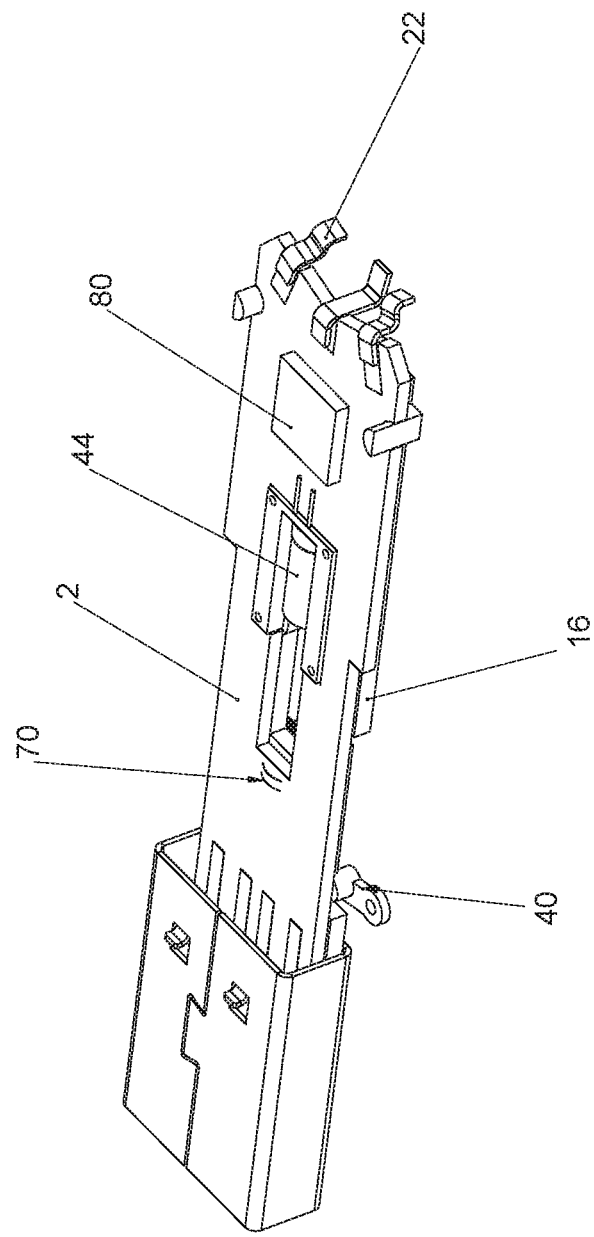

FIG. 4 depicts an internal view of the USB locking dongle from the top while the USB locking dongle is in an unlocked position. Both the inner case 6 and the external lock housing 12 have been removed from FIG. 4. The printed circuit board 2 is attached to the sliding member 16. Both the printed circuit board 2 and the sliding member 16 move together as one unit. A locking arm 40 is extended outward from the printed circuit board 2 at an angle other than perpendicular to said printed circuit board 2. The printed circuit board 2 extends from the plug 8 through both the inner case 6 and the external lock housing 12 to the terminal pins 22. The printed circuit board 2 mechanically supports the terminal pins 22, the central processing unit 80 (hereinafter "CPU"), the solenoid 44, the latch tab 48, the sliding member 16, and two prongs 4 on the top surface of the plug 8 that physically anchor into USB port or other electronic port. The printed circuit board electrically connects the terminal pins 22, the CPU 80, the solenoid 46, and the locking arms 40 using conductive tracks, pads, and other features. The CPU 80 is positioned on top of the printed circuit board 2 beneath the external lock housing 12 mid way between the attachment points of the terminal pins 22 and the solenoid 44. An electronically coded key device interacts with the terminal pins 22, which transmit the code to the CPU 80. The CPU 80 processes the transmitted code and energizes the solenoid 46 when the correct code is received.

Figure 5:
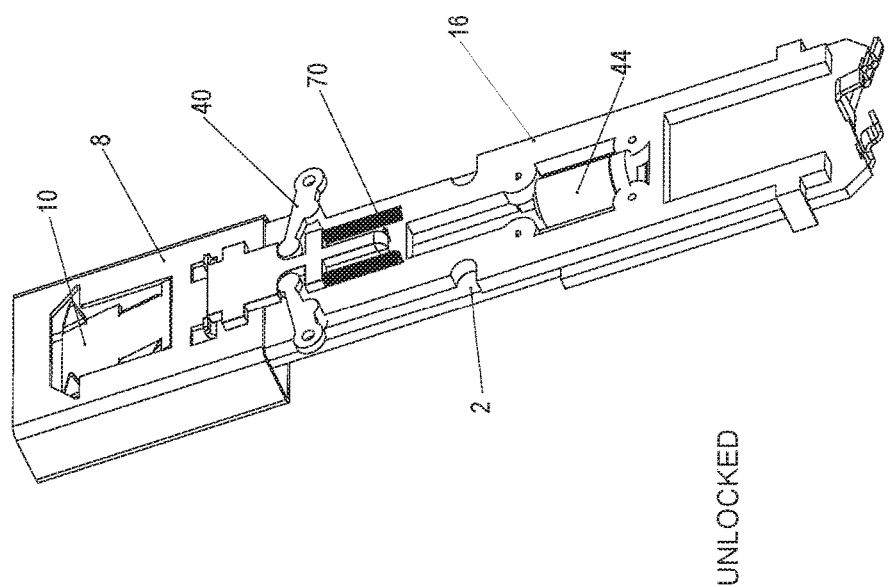

The USB locking dongle in an unlocked position is shown in FIG. 5. FIG. 5 depicts the USB dongle from the top with the inner case 6 and external lock housing 12 removed. The spring tab 10 is located on the bottom of the USB plug 8 and contains two protruding barbs 14 at its free end that are extended down through the plug 8 and into the port of the electronic device plugging said port. The spring tab 10 and protruding barbs 14 are composed of metal, plastic, or other rigid material suitable for creating a lock. The location of the protruding barbs 14 on the bottom of the plug 8 prevents the removal of the USB Port Lock and Electronic Key Device from a USB port through the use of tweezers or a similar instrument. Any removal of the USB dongle when the protruding barbs 14 are engaged will damage or destroy the USB port making said port inoperable.

When the USB locking dongle is in an unlocked position, as shown in FIG. 5, the external lock housing 12 can be reversibly moved over the inner case 6. The spring tab 10 and protruding barbs 14 are contained within the plug 8 when the USB locking dongle is unlocked. The locking arms 40 are positioned within notches on the latch tab 48. The locking arms 40 are not locked within the notches located on the latch tab 48. The sliding member 16 can be moved in and out of plug 8. The solenoid 46 and electromagnet 44 are not energized. The solenoid 46 and electromagnet 44 are only energized during the unlocking procedure.

Figure 6:
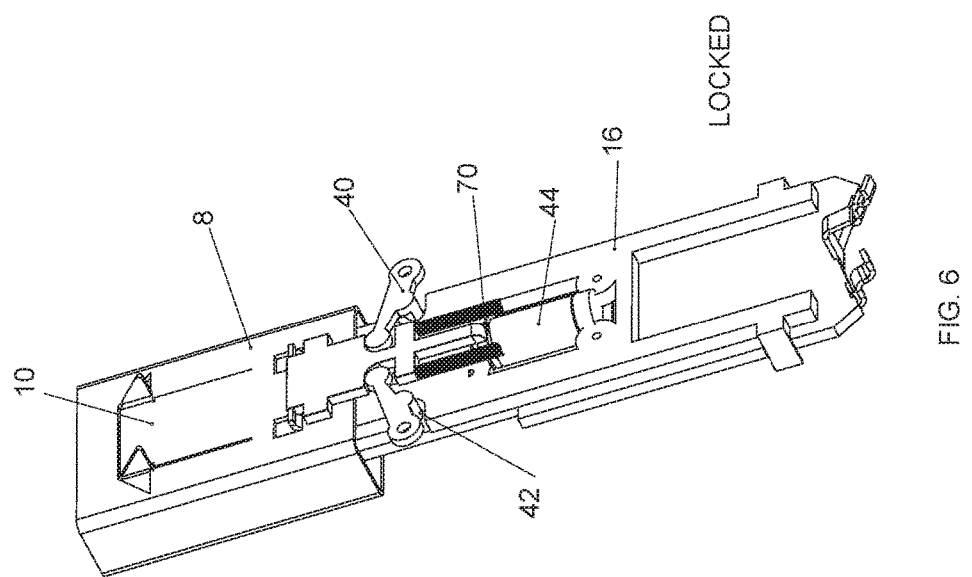

The USB locking dongle is shown in a locked position in FIG. 6. When locked, the spring tab 10 is flush with the plug 8, the protruding barbs 14 are fully extended through plug 8 so that they can latch onto a USB port or other computer port, both locking arms 40 are positioned so that the locking blades 42 are positioned within two corresponding notches located on the sliding member 16 preventing the movement of said sliding member 16, and the solenoid 46 and electromagnet 44 are not energized. FIG. 6 depicts the location of the solenoid 46 and electromagnet 44 in relation to the latch tab 48. The solenoid 46 and electromagnet 44 are much closer to the latch tab 48 in the locked position shown in FIG. 6 than in the unlocked position shown in FIG. 5. In the unlocked position shown in FIG. 5, the sliding member 16 and the printed circuit board 2 may be fully extended from plug 8. Whereas, in the locked position, a much larger length of both the sliding member 16 and the printed circuit board 2 are pushed within the plug 8 and are no longer visible to the user. The overall length of the USB locking dongle is less when the dongle is locked than when the dongle is unlocked and fully extended.

The external lock housing 12 houses an electromagnet 44, a solenoid 46, two case springs 54, a key platform 20, and two lock pins 22. The plug 8 comprises the external locking interface, a spring tab 10, and two protruding barbs 14 attached to the free end of the spring tab 10. When the locking dongle is engaged, the two locking arms 40 fit into notches on the sliding member 16. Manually sliding the external lock housing 12 over the inner case 6 forces the sliding member 16 into the plug 8. This pushes the spring tab 10 downward, which pushes the protruding barbs 14 down into the female connector of the USB port. The protruding barbs 14 physically anchor the USB dongle into the USB port.

FIG. 5 depicts a side view of the USB dongle in an unlocked position. FIG. 6 depicts a side view of the USB dongle in a locked position. The bottom half of the external lock housing 12 and the inner case 6 have been cut away from these figures. The protruding barbs that are almost absent from FIG. 5, are prominently depicted in FIG. 6. FIG. 5 shows the relative position of sliding member 16 in an unlocked USB locking dongle. Note that the sliding member 16 is positioned on top of the printed circuit board 2. FIG. 6 depicts the sliding member 16 within the USB shell 8 when the USB locking dongle is engaged. Lock pen 70 is obscured by the locking latch springs 52 in the unlocked position of FIG. 5. In the locked position depicted in FIG. 6, lock pin 70 is fully visible. When the locking dongle is in a locked position, the lock pin 70 does not contact the sliding member 16. When the USB locking dongle is unlocked, lock pin 70, which is attached to the latch tab 48, remains stationary. Lock pin 70 and latch tab 48 only move when the USB locking dongle is energized.

Figure 7:
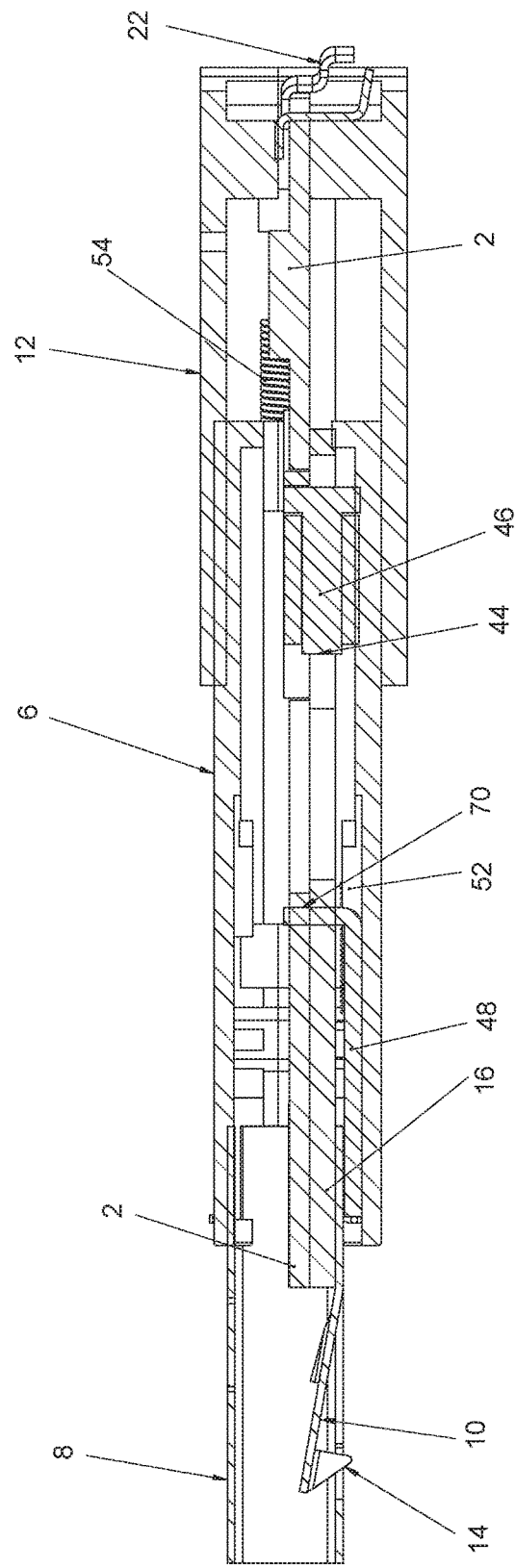

FIG. 7 depicts a mid sectional view of the USB locking dongle in an unlocked position. In the unlocked position, the USB locking dongle has its maximum overall length. Although the length of the external lock housing 12 visible to the user is consistent whether the USB locking dongle is locked or unlocked, the visible lengths of both the inner case 6 and the plug 8 are reduced during the locking process. The external lock housing 12 slides over the inner case 6 during the locking mechanism which reduces the overall visible length of the inner case 6. Additionally, inner case 6 slides over plug 8 during the locking process reducing the visible length of plug 8.

FIG. 7 shows the position of the protruding barb 14 when the USB locking dongle is unlocked. The protruding barb 14 is shown retracted within plug 8 in FIG. 7. The protruding barb 14 attaches to the spring tab 10, which attaches to the plug 8. The sliding member 16 is physically secured to the printed circuit board 2. In the unlocked position shown, the sliding member 16 and the printed circuit board 2 are not in contact with the spring tab 10. The USB dongle locks when the sliding member 16 and printed circuit board 2 are pushed into the plug 8 so that the sliding member 16 pushes the spring tab 10 downward, which pushes the protruding barb 14 outside of plug 8 and into a USB port. One or more protruding barbs 14 make physical contact with the inside structure of the computer port locking the USB dongle into said port. FIG. 7 shows the length of the printed circuit board 2, which connects to the terminal pins 22 at the electronic key platform 20, spans the length of the dongle, and terminates at the point that the sliding member 16 terminates. The lock pin 70 is at its maximum distance from electromagnet 44 when the USB locking dongle is unlocked. Locking the dongle decreases the distance between the electromagnet 44 and the lock pin 70, which decreases the overall length of the USB locking dongle. During the unlocking process, latch tab 48 and lock pin 70 move closer to the electromagnet 44, which decreases the distance between the lock pin 70 and the electromagnet 44 and decreases the overall length of the USB locking dongle. The position of compression locking latch spring 52 and case spring 54 are shown in an unlocked USB Port Lock and Electronic Key Device in FIG. 7. The locking latch springs 52 and case springs 54 are at their further positions from each other when the USB locking dongle is unlocked. During the locking process, the external lock housing 12 slides over inner case 6 reducing the distance between the locking latch springs 52 and the case springs 54.

Figure 8:
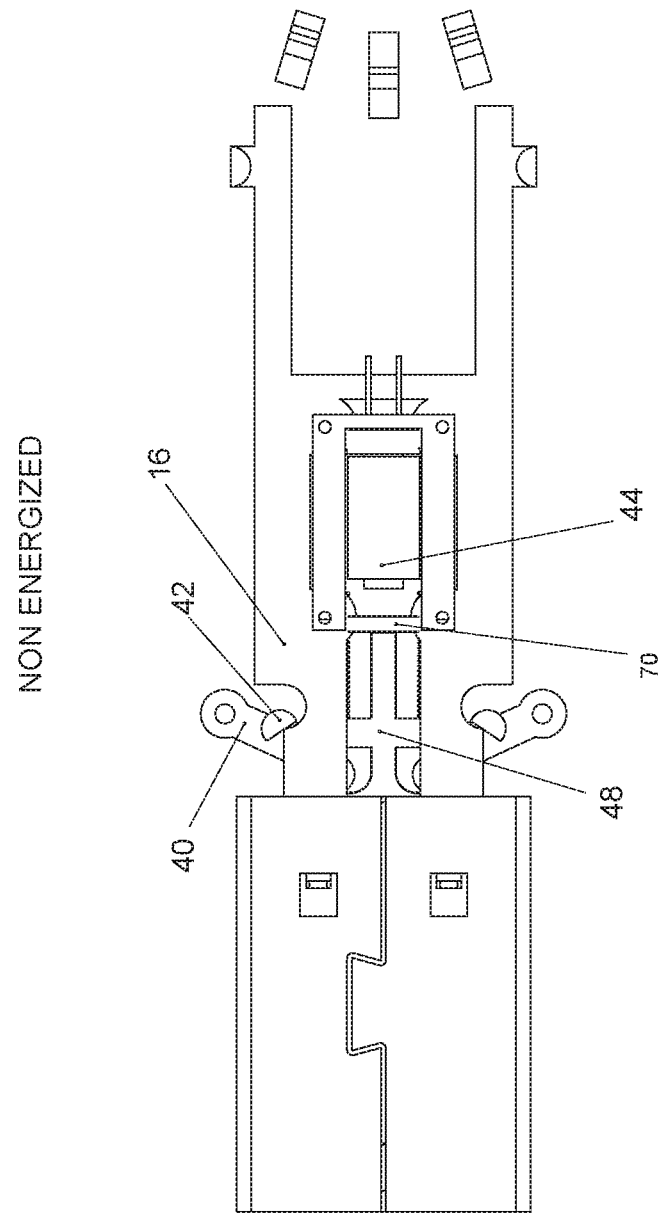
Figure 9:
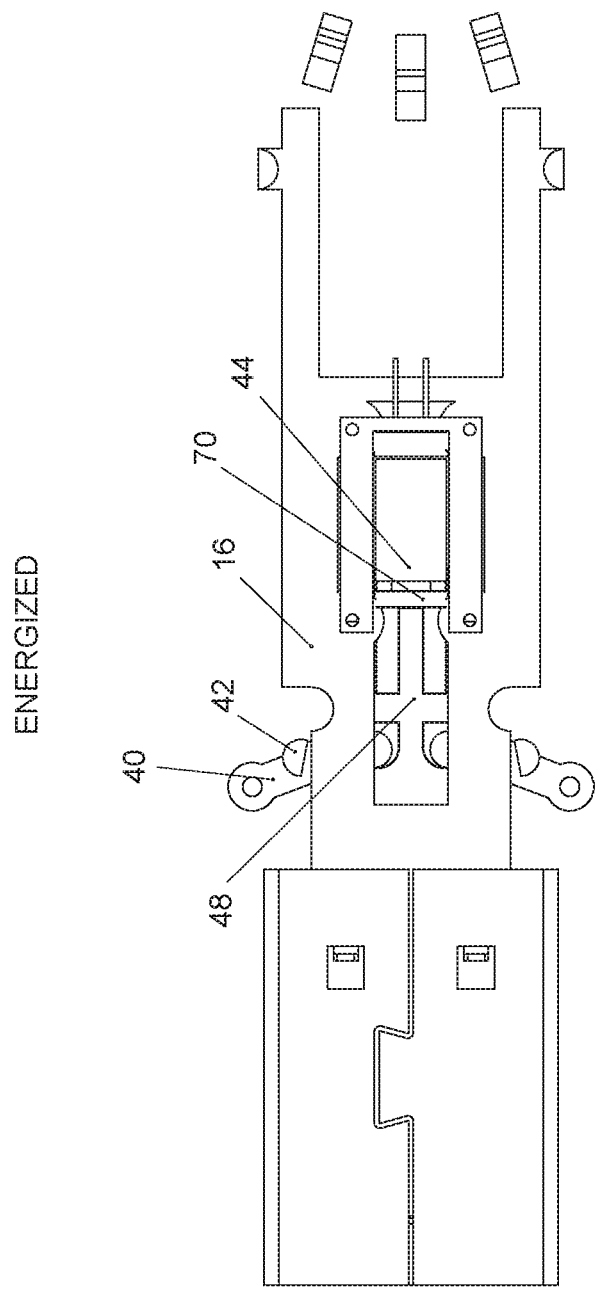

FIG. 8 depicts a top view of the USB locking dongle in a non-energized state while FIG. 9 depicts a top view of the USB locking dongle in an energized state. The USB locking dongle is locked in FIG. 8 and unlocked in FIG. 9. Both the external lock housing 12 and the inner case 6 have been removed from the USB locking dongle shown in FIGS. 8 and 9. FIG. 8 shows the USB locking dongle in locked, non-energized state. The locking arms 40 are positioned so that the locking blades 42 are positioned within a notch on the printed circuit board 2. The half-moon shape of the locking blades 42 prevents the removal of the USB locking dongle from the port because the locking blades 42 push against the notch when the external lock housing 12 or the inner case 6 or manually manipulated when the USB locking dongle is non-energized. The lock pin 70 is not in physical contact with electromagnet 44 and lock pin 70 is not magnetically attracted to electromagnet 44 when the USB locking dongle is non-energized.

FIG. 9 depicts the USB locking dongle when energized. The USB locking dongle is energized by the USB port when a properly coded electronic key is positioned correctly on the key platform 20 so that said key makes physical contact with all of the key terminals 22. 5 volts of energy are transferred from the USB port to solenoid 46 when the correct key is received. This energy powers solenoid 46, which powers electromagnet 44 and activates the magnetic charge of said electromagnet 44. The energized electromagnet 44 magnetically attracts lock pin 70 to said electromagnet 44 causing the physical movement of lock pin 70 and latch tab 48 towards electromagnet 44 until lock pin 70 sticks to electromagnet 44. The latch tab 48 moves with lock pin 70. Latch tab 48 pushes into pins 41 moving them to the side, causing the movement of locking arms 40 about pins 41, which pivots the locking blades 42 out of the notches located on sliding member 16, releasing sliding member 16 from the locked position to the unlocked position. If the user then manually pulls back on the external lock housing 12, the printed circuit board 2 and sliding member 16 move away from plug 8, which allows the spring tab 10 to retract into the plug 8 retracting the protruding barbs 14 into the plug 8 unlocking the USB Port Lock and Electronic Key Device from the USB port.

Figure 10:
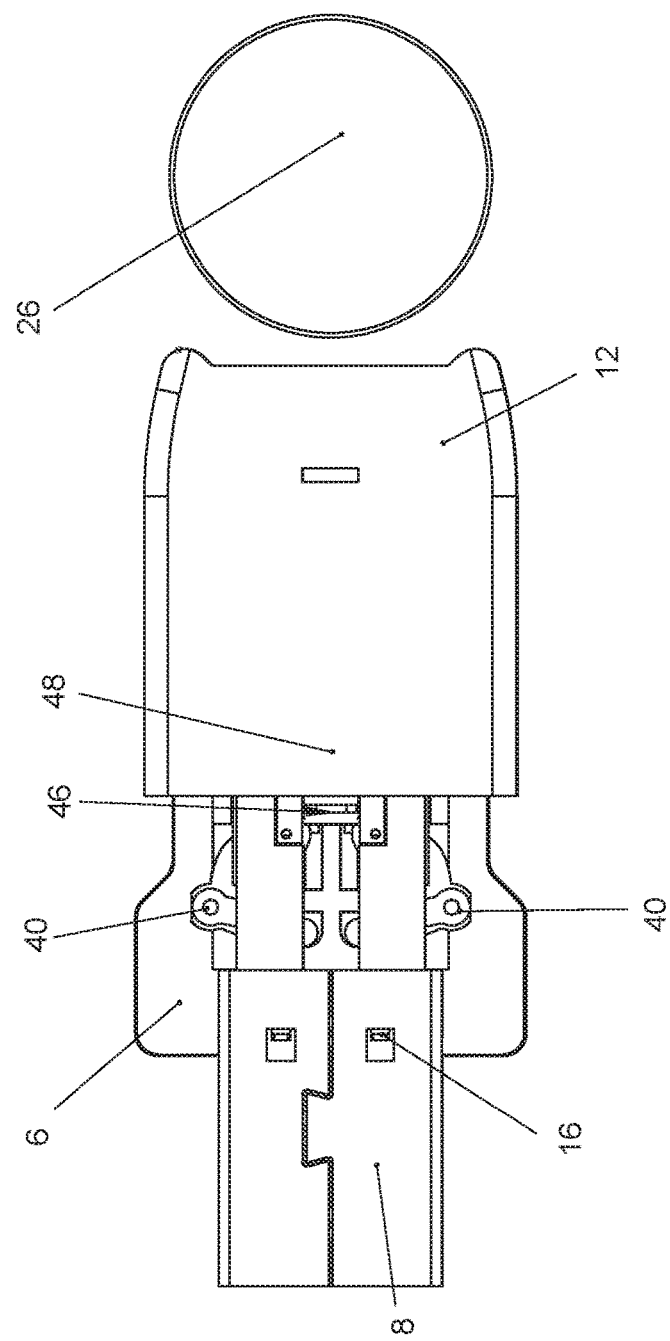

FIG. 10 shows a top view of the USB locking dongle with an iButton® in position to unlock the USB Port Lock and Electronic Key Device. The memory device 26 makes contact with the three terminal pins 22 located on the key platform 20 that are projecting from the printed circuit board 2. The iButton® is a commercially available button-shaped device with an internal, programmable memory device. The iButton® 26 does not require an internal battery. The iButton® 26 receives power from the USB port via the key terminals 22 located on the key platform 20 of the USB locking dongle. The stainless steel case of the iButton® 26 is utilized as a electronic communications device. The iButton® has two contact points that make contact with the three key terminals 22. Each of these contact points is connected to a silicon chip contained within the iButton®. Two of these key terminals 22 are data contacts and the third key terminal 22 is a ground contact. This figure shows lock pin 70 making contact with electromagnet 44.

Figure 11:
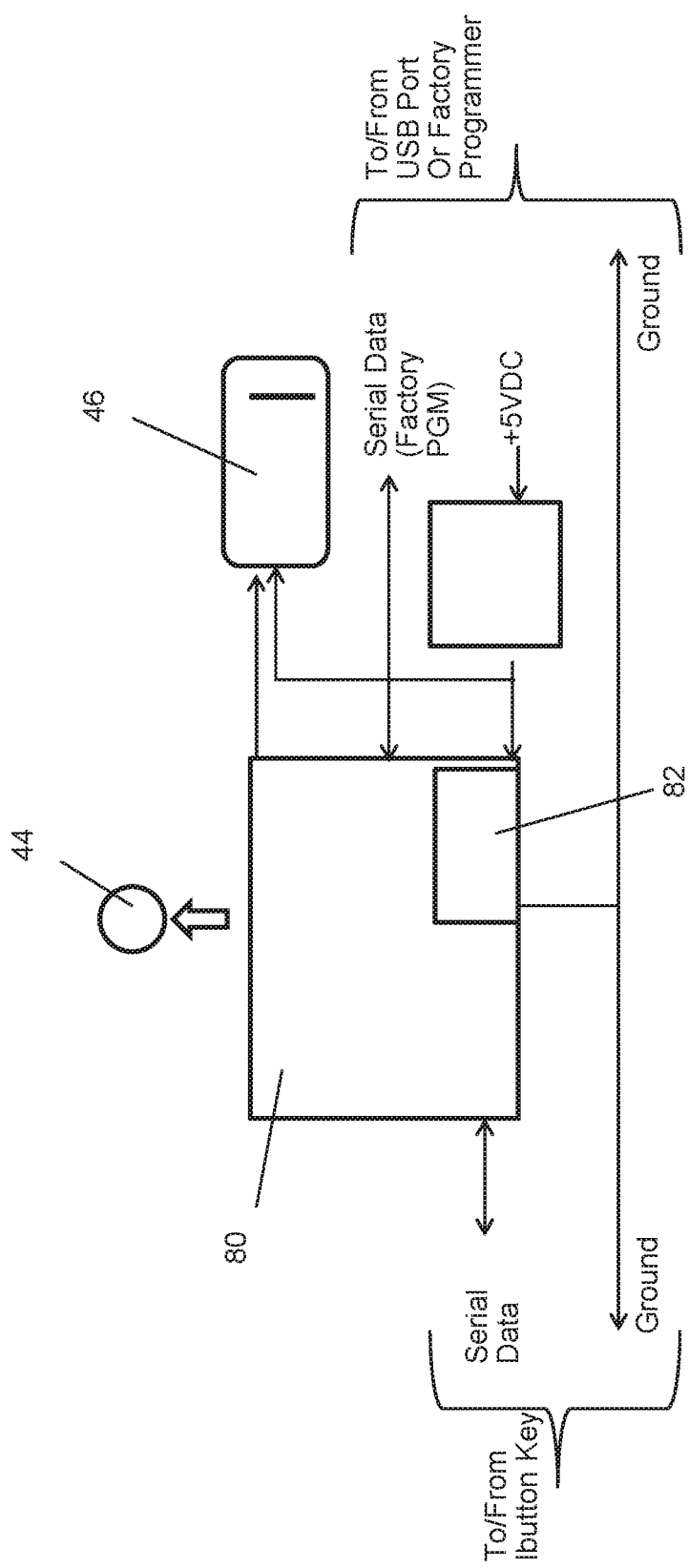
FIGS. 11 and 12 depict the electronic mechanism and electronic configuration of the USB Port Lock and Electronic Key Device. In the Figures.

The configuration of the electronic locking mechanism located with the lock housing 12 of the locking dongle is depicted in FIG. 11. The key electronic component of the USB locking dongle is the central processing unit 80 (hereinafter "CPU"). The CPU 80 contains the firmware that performs all functions in the system and has the non-volatile memory 82 necessary to store the serial number, group ID, and other data elements that are used for decoding the electronic memory device or iButton® 26. The CPU 80 controls the communications channel for interfacing and transferring information to and from the iButton® 26. Additionally, the CPU 80 controls the communications channel for transferring information to and from the programmer. The CPU 80 can be used to transmit data to the computer when the USB Port Lock and Electronic Key Device is engaged in the USB port. The CPU 80 also can be utilized to communicate with the computer to send data to the programmer relating to any attempts to remove the USB Port Lock and Electronic Key Device.

Figure 12:
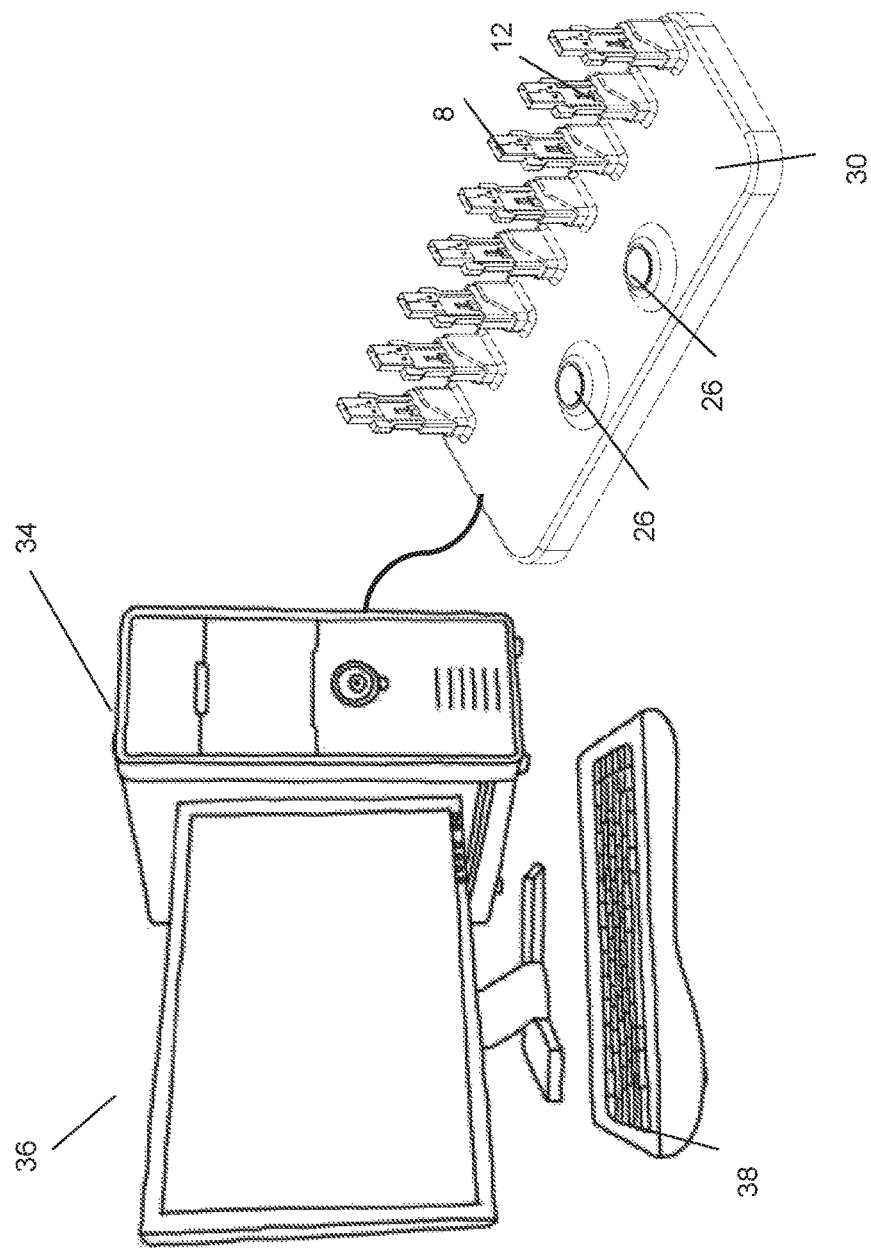

FIG. 12 illustrates the software and hardware components of the USB Port Lock and Electronic Key Device. The software and hardware components enable the programming of the iButton® 26 with the appropriate response so that the USB locking dongle can be disengaged from the USB port. The programmer consists of a computer hard drive, monitor, and key board (34, 36, and 38 respectively), a programming station 30 that can hold one or two iButton®s 26 and up to eight USB locking dongles. The computer hard drive 34 will maintain a database or be attached to a database server for the assignment of and storage of the USB locking dongle key codes. The computer hard drive 34 is attached via a USB port to the programming station 30 where it is capable of integrating and programming each iButton® 26 and each USB locking dongle. The programmer will start the programming application and insert one or more 26 and one or more USB locking dongles into 30. The programming application will allow the creation of keys and locks, the programming of a new key for an existing lock, or the programming of one or more new locks for an existing key.

Figure 13:
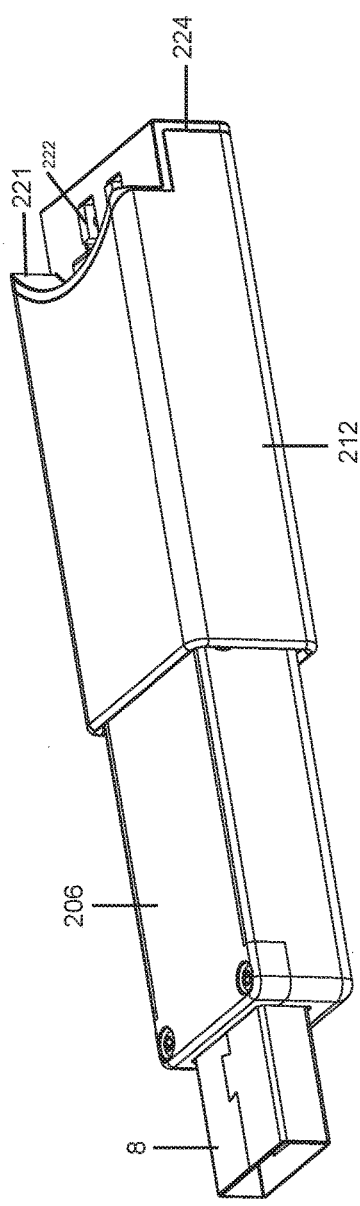

An exterior, top angled view of the hook casting embodiment is shown in FIG. 13. Plug 8 is composed of metal or other suitable material to mechanically plug a USB port. Inner case 206 freely slides within outer case 212 when in an unlocked position. An iButton® is positioned against rear sidewall 221 so that it interacts with key terminals 225. Rear sidewall 224 encases rear surface of the device. Inner case 206, outer case 212, and rear sidewall 224 are composed of a suitable material, such as sheet metal, to protect the internal components of the USB Port Lock and Electronic Key Device and to resist water, corrosion, and tampering.

Figure 14:
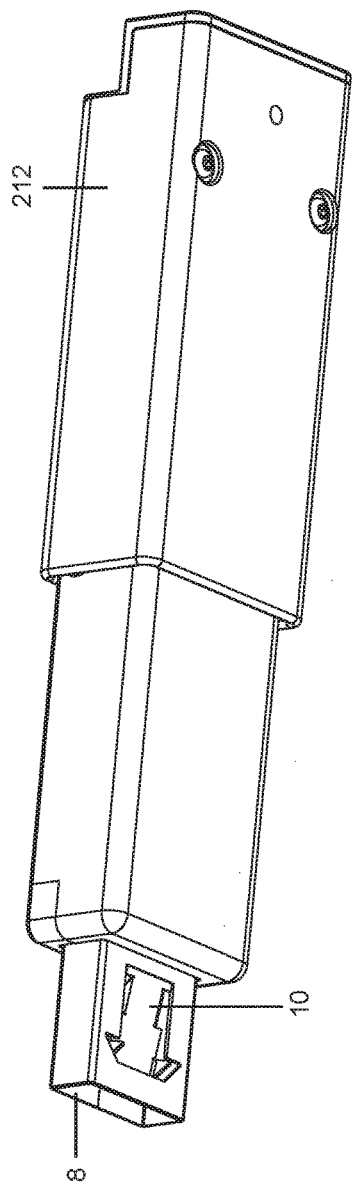
Figure 15:
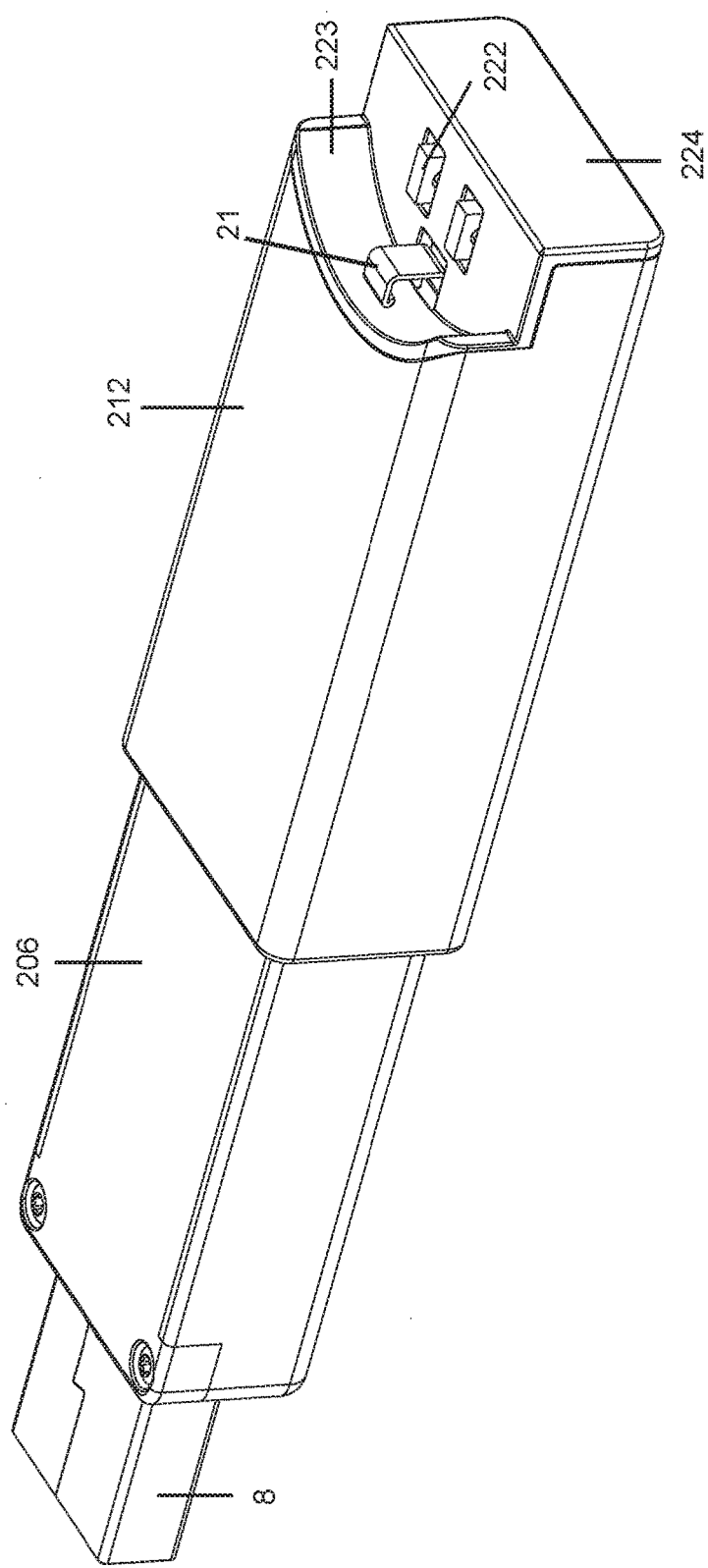

FIG. 14 depicts an exterior, angled view of the bottom of the USB Port Lock and Electronic Key Device. The top and bottom portions of outer case 212 are secured tightly together with screws shown in this illustration. Plug 8 includes spring tab 10 that contains barbs 14 (numbered in FIG. 17) that are utilized to anchor plug 8 into the USB port. FIG. 15 shows rear sidewall 223 that is shaped to receive an iButton®. Key terminals 21, and two key terminals 222 interact with an iButton® to initiate the unlock function.

Sectional illustrations of the USB Port Lock and Electronic Key Device in both unlocked and locked positions is shown in FIGS. 16 and 17, respectively. In the unlocked position: spring tab 10 is not engaged with a USB port, inner case 206 moves freely in and out of outer case 221, solenoid 244 in not powered on, the hook 230 of the hook casting member (hook 230, solenoid link mount 236, and cast chassis mount 232) is not in contact with the cast latch ramp 260 or the cast latch shelf 262, the printed circuit board 250 moves freely within inner case 206, and key terminals 222 are not receiving the correct signal from a corresponding iButton®. FIG. 17 illustrates the locked position wherein: printed circuit board 250 is engaged with spring tab 10 forcing barbs 14 into the USB port plugging it, inner case 206 is fully contracted within outer case 212 and is no longer able to freely move back and forth, hook 230 is secured upon cast latch shelf 262 (shown in FIG. 22), solenoid 244 is powered "off", solenoid arm 240 is in a locked position, solenoid link mount 236 is perpendicular to printed circuit board 250, and key terminals 222 are accessible to an iButton®.

Figure 18:
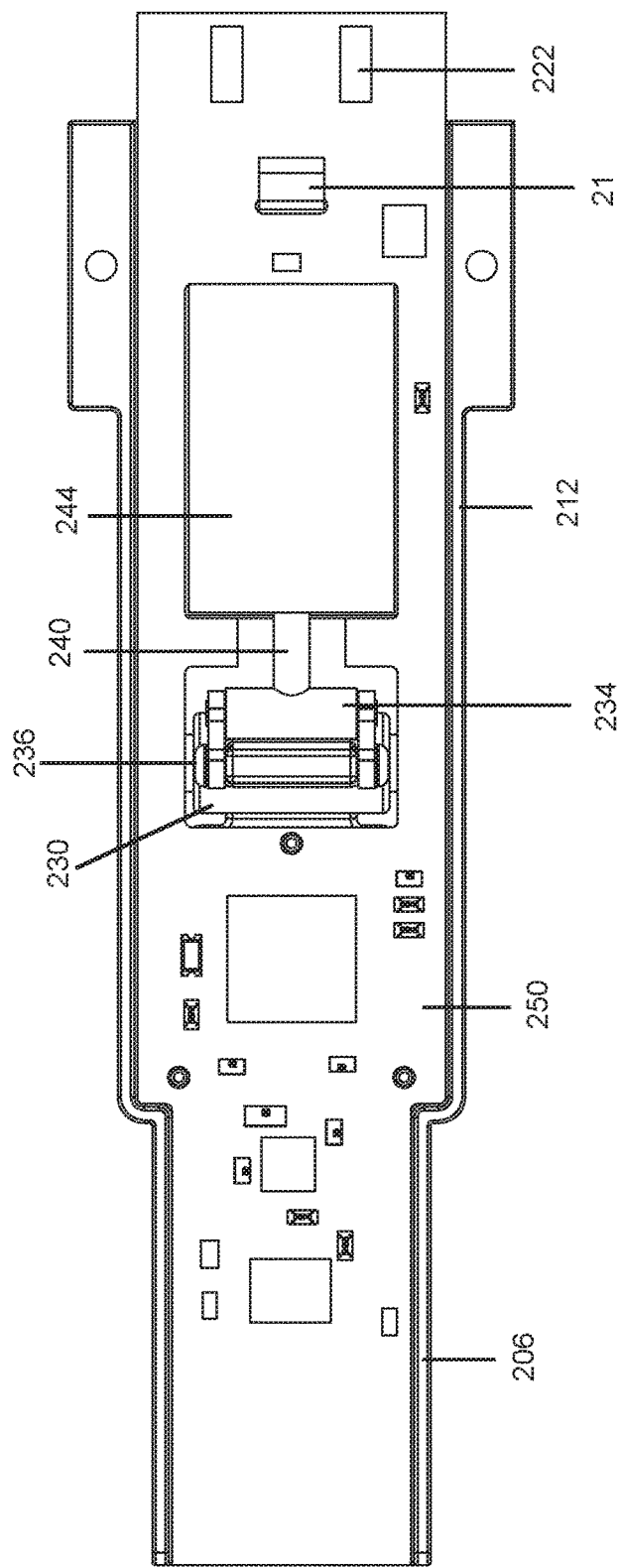

FIG. 18 depicts a top view of printed circuit board 250. Solenoid link mount 236 is positioned perpendicular to printed circuit board 250 in an "off" position. Hook 230 can be seen beneath solenoid link mount 236. Solenoid pull 234 connects to solenoid arm 240 and to chain link 233. When the correct iButton® interacts with key terminals 222 and 21, the solenoid 244 is powered "on", which causes solenoid arm 240 to retract within solenoid 244, pulling solenoid pull 234. The pulling motion of solenoid pull 234 causes chain links 233 to pull solenoid link mount 236 so that it is no longer perpendicular to printed circuit board 250, which moves hook 230 into an unlocked position.

A top-angled view of the hook casting embodiment in the locked position without the inner case 206 or outer case 212 is shown in FIG. 19. The unlocking, top-angled view with the casing removed is shown in FIG. 20. The locked position features includes: hook 230 is fixed upon cast latch shelf 262 (shown in FIG. 22) so that hook 230 is positioned parallel to printed circuit board 250, cast chassis mount 232 is parallel to printed circuit board 250 while solenoid link mount 236 is perpendicular to printed circuit board 250, solenoid 244 is powered "off", solenoid pull 234 is not engaged and is fully extended via solenoid arm 240 from solenoid 244, and key terminals 222 are accessible to an iButton®. FIG. 20 depicts the unlocking mechanism of the hook casting embodiment wherein printed circuit board 250 is freely movable within inner case 206 (shown in FIG. 16), hook 230 is positioned at an angle to printed circuit board 250 as it travels down catch latch ramp 260 (shown in FIG. 22), cast chassis mount 232 is positioned at an angle to printed circuit board 250, solenoid link mount 236 is moves so that it no longer is perpendicular to printed circuit board 250, and solenoid pull 234 is being pulled toward solenoid 244 by solenoid arm 240 while solenoid 244 is powered "on".

FIG. 21 depicts a sectional view of the hook casting embodiment in a locked position and FIG. 22 depicts it during the unlocking mechanism. FIG. 21 depicts the USB Port Lock and Electronic Key Device in a locked position wherein printed circuit board 250 forces barbs 14 to be fully extended locking the device into a USB port, inner case 206 is fully retracted within outer case 212, hook 230 is locked onto cast latch shelf 262 and unable to slide along cast latch ramp 260, cast chassis mount 232 and hook 230 are parallel to printed circuit board 250, cast chassis mount 232 is pressing against cast chassis mount stop 282, solenoid arm 240 is fully extended from solenoid 244, and void space 280 is at it's smallest length. FIG. 22 depicts a sectional view of the unlocking mechanism wherein: the movement of solenoid arm 240 away from the solenoid causes hook 230 to be pulled so that it lifts off of cast latch shelf 262 and slides down along cast latch shelf ramp 260, and case chassis mount 232 is at an angle to printed circuit board 250 and moving along inner case 206 causing inner case 206 to move away from outer case 212 increasing the length of void space 280.

A sectional, angled view of the hook casting embodiment is shown in the locked position in FIG. 23. In FIG. 23, hook 230 is securely locking inner case 206 into outer case 207 forcing barbs 14 to extend outside of the USB Port Lock and Electronic Key Device. Case chassis mount 232 is forced against chassis mount stop 282 in a locked position, chain link 233 is in a locked position so that solenoid link mount 236 is perpendicular to printed circuit board 250 and solenoid arm 240 is fully extended from solenoid 244. FIG. 24 shows a sectional view of the USB Port Lock and Electronic Key Device hook casting embodiment during the unlocking mechanism wherein: hook 230 is lifted off of cast latch shelf 262 and slides down along cast latch shelf ramp 260. During the locking mechanism, solenoid arm 240 is pulled into solenoid 244, which forces the movement of the hook casting member (hook 230, solenoid link mount 236, and cast chassis mount 232) over the cast latch shelf 262.

Figure 25:
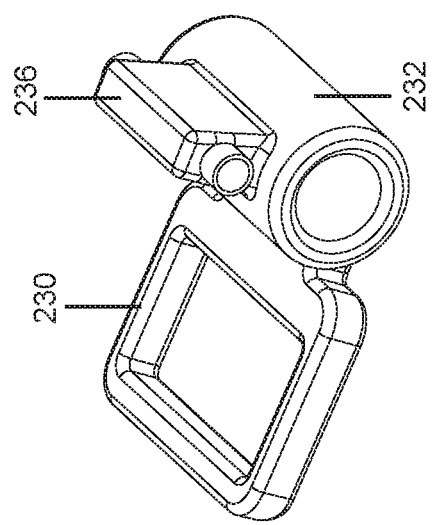

FIG. 25 depicts the hook casting member which is composed of the following parts: hook 230, solenoid link mount 236, and cast chassis mount 232.

Figure 26:
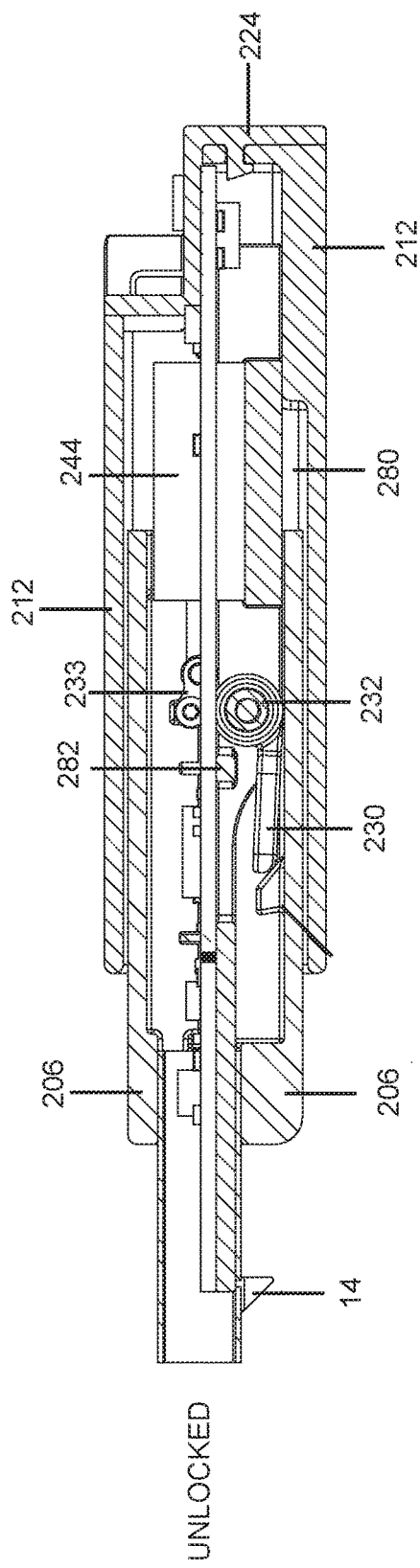
FIG. 26 depicts a sectional view of the USB Port Lock and Electronic Key Device hook casting embodiment in an unlocked position.

FIG. 26 depicts a sectional view of the USB Port Lock and Electronic Key Device device in an unlocked position wherein inner case 206 freely moves within outer case 212. Hook 230 rests parallel to printed circuit board 250 along inner case 206. Void 280 is at its maximum length when the device is unlocked. Cast chassis mount 232 is at its maximum distance from chassis mount stop 282 so that it does not contact it. Chain link 233 is in a fixed position when solenoid 244 is powered "off".

Figure 27:
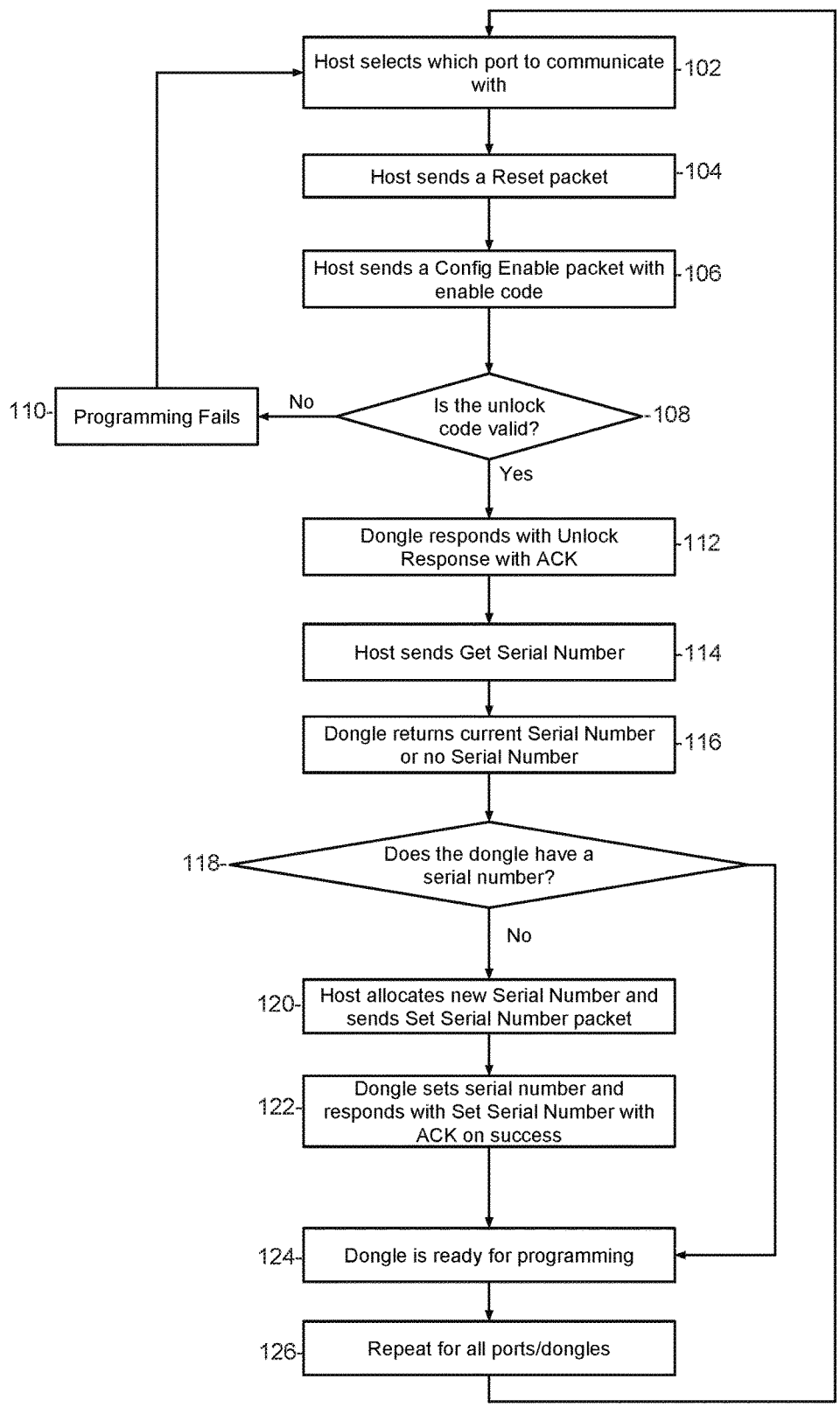
FIG. 27 is a flow chart that illustrates the programming steps to initialize the USB locking dongle.

FIG. 27 is a flow chart that illustrates an example of the steps to initialize the USB locking dongle for programming Upon placing one or more USB locking dongles into the programming station 30, the programmer takes the steps as set forth in FIG. 27. The USB locking dongle is inserted into the programming station 30 so that the external lock housing 12 contacts a port on the programming station 30 and the terminal pins 22 (not shown) are in contact with receptors (not shown) located on the programming station 30. During the first step, Box 102, the programmer utilizes the Host PC (34, 36, and 38) to select to program the port(s) located on the programming station 30 that corresponds to the port wherein the USB locking dongle is inserted. Next, at Box 104 and 106, the Host PC (34, 36, and 38) performs housekeeping functions to prepare the USB locking dongle to receive data by initializing memory registers with predetermined initialization values along with other functions in preparation for programming. The Host PC (34, 36, and 38) sends a "Reset" packet at Box 104 and, a "Config Enable" packet at Box 106 with the enable code. The "Config Enable" packet contains the code that will unlock the USB locking dongle. If the unlock code sent by the Host PC (34, 36, and 38) is valid at Box 108, then the USB locking dongle responds with an Unlock Response with Acknowledgment (hereinafter "ACK") at Box 112. The "Unlock Response with ACK" command informs the Host PC (34, 36, and 38) that a valid code has been received and the USB locking dongle is ready to accept information. If the unlock code sent by the Host PC (34, 36, and 38) is invalid at Box 108, then the programming fails at Box 110 and the initialization process must be repeated starting with Box 102.

Once the USB locking dongle responds with an "Unlock Response with ACK" Box 112, the Host PC (34, 36, and 38) sends the "Get Serial Number" command at Box 114. The USB locking dongle returns either a current "Serial Number" or no "Serial Number" reply to the Host PC (34, 36, and 38) at Box 116. The Serial Number is a unique number used to identify the USB locking dongle or other device. If the USB locking dongle does not have an assigned Serial Number at Box 118 as when the electronic key is not an iButton®, then the Host PC (34, 36, and 38) allocates a new Serial Number to the USB locking dongle and sends to the dongle a "Set Serial Number" packet assigning a new Serial Number to the dongle Box 120. The Serial Number is assigned so that it will correspond to a particular iButton® 26 or set of iButton®s 26. Upon receipt of the newly assigned Serial Number, the USB locking dongle sets the Serial Number so that it is identified by said Serial Number at Box 122. Additionally, the USB locking dongle responds to the Host PC (34, 36, and 38) with the "Set Serial Number with ACK" response to communicate to the Host that the assigned Serial Number has been successfully assigned and stored in the USB locking dongle memory. The USB locking dongle is now ready for programming, Box 124. The process from Box 102 to Box 124 must be repeated for all USB locking dongles to be initialized.

Figure 28:
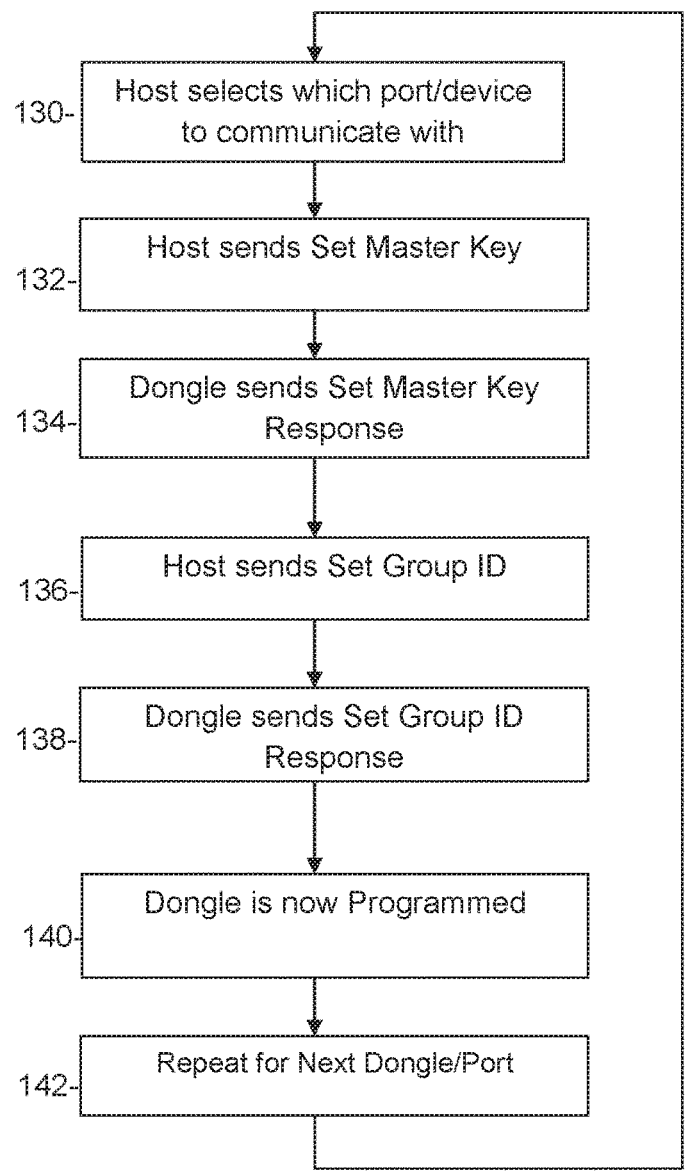
FIG. 28 is a flow chart that illustrates the programming of a USB locking dongle.

FIG. 28 illustrates the programming of a USB locking dongle by the Host PC (34, 36, and 38). These steps can be taken to either program or reprogram a USB locking dongle. The first step in the programming process is the selection by the Host PC (34, 36, and 38) of which port/device to communicate with at Box 130. Then the Host PC (34, 36, and 38) sends the "Set Master Key" command to the USB locking dongle. The USB locking dongle contains a value known as the Master Key. The Master Key is used to encrypt and decrypt the Memory Encode Key as well as being part of the signature encrypt and decrypt process. The USB locking dongle responds to the "Set Master Key" command at Box 132 by sending a "Set Master Key Response" command at Box 134 to the USB locking dongle. Next, the Host PC (34, 36, and 38) sends to the USB locking dongle a "Set Group ID" command at Box 136. The Group ID is specific to a USB locking dongle or group of USB locking dongles, corresponds to the Group ID assigned to a particular electronic key device, and is used as part of the encryption protocol to unlock the USB locking dongle. Upon receipt of the "Set Group ID" command at Box 136, the Group ID is assigned to the USB locking dongle and the dongle sends a "Set Group ID Response" shown in Box 138 to the Host PC (34, 36, and 38). The "Set Group ID Response" shown in Box 138 informs the Host PC (34, 36, and 38) that the USB locking dongle is properly programmed at Box 140. Steps shown in Boxes 130 through 140 are repeated for each USB locking dongle to be programmed, Box 142.

Figure 29:
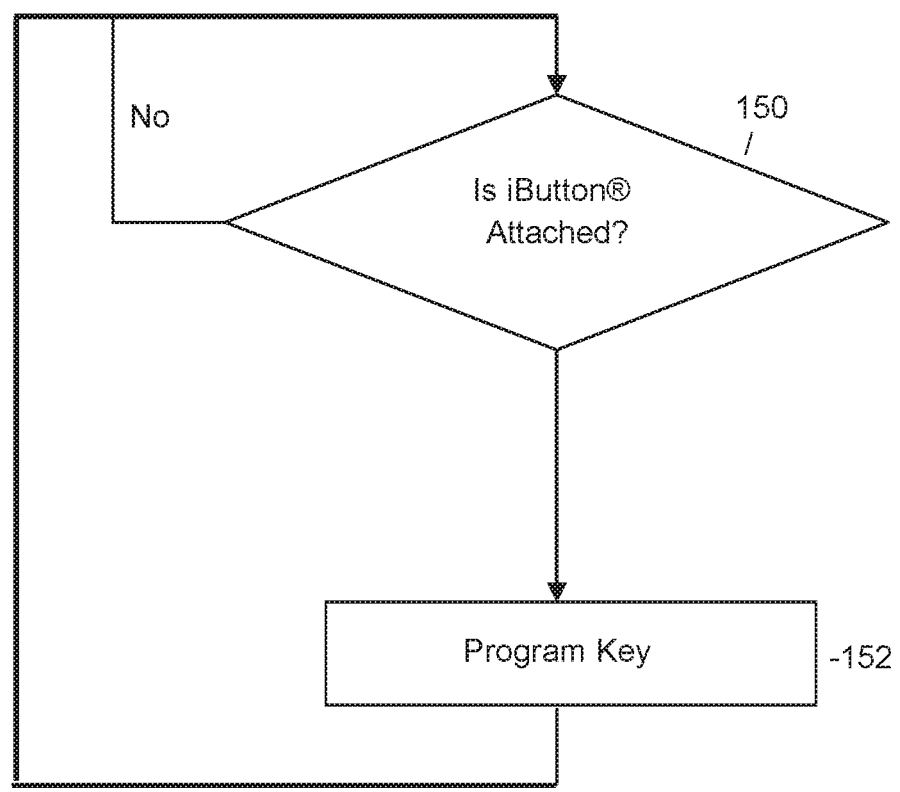
FIG. 29 is a flow chart that illustrates the programming of an iButton® 26.

FIG. 29 illustrates the process of programming an iButton® 26 to function as an electronic key that can unlock the USB locking dongle from a USB computer port. When an iButton® 26 is positioned on the correct port of the programming station 30 for programming at Box 150, the Host PC (34, 36, and 38) programs the iButton® 26 to unlock a specific USB locking dongle or group of USB locking dongles. Upon purchase, an iButton® 26 does not need to be programmed with a Serial Number because it comes pre-programmed with a Master Key that is used to encrypt and decrypt the Memory Encode Key and is part of the signature encrypt and decrypt process. While the encryption/decryption process of the instant invention is proprietary, it should be apparent to one of ordinary skill in the art that any suitable encryption/decryption scheme may be used, such as any of the RSA variants, DES, and so forth. The Host PC (34, 36, and 38) retrieves the Master Key from the iButton® 26 and randomly generates a Memory Encode Key. The Memory Encode Key is then encrypted using a proprietary encryption scheme with the Master Key. The Master Key and the plain text Memory Encode Key and the Group ID's for a specific iButton® 26 are all encrypted creating a signature, which is appended to the Memory Encode Key and stored on the iButton® 26. The information stored on the iButton® 26 is broken down into segments with each segment having a cyclic redundancy check computed and stored on the iButton® 26. Each iButton® 26 can be programmed with multiple signatures until the device is full.

Figure 30:
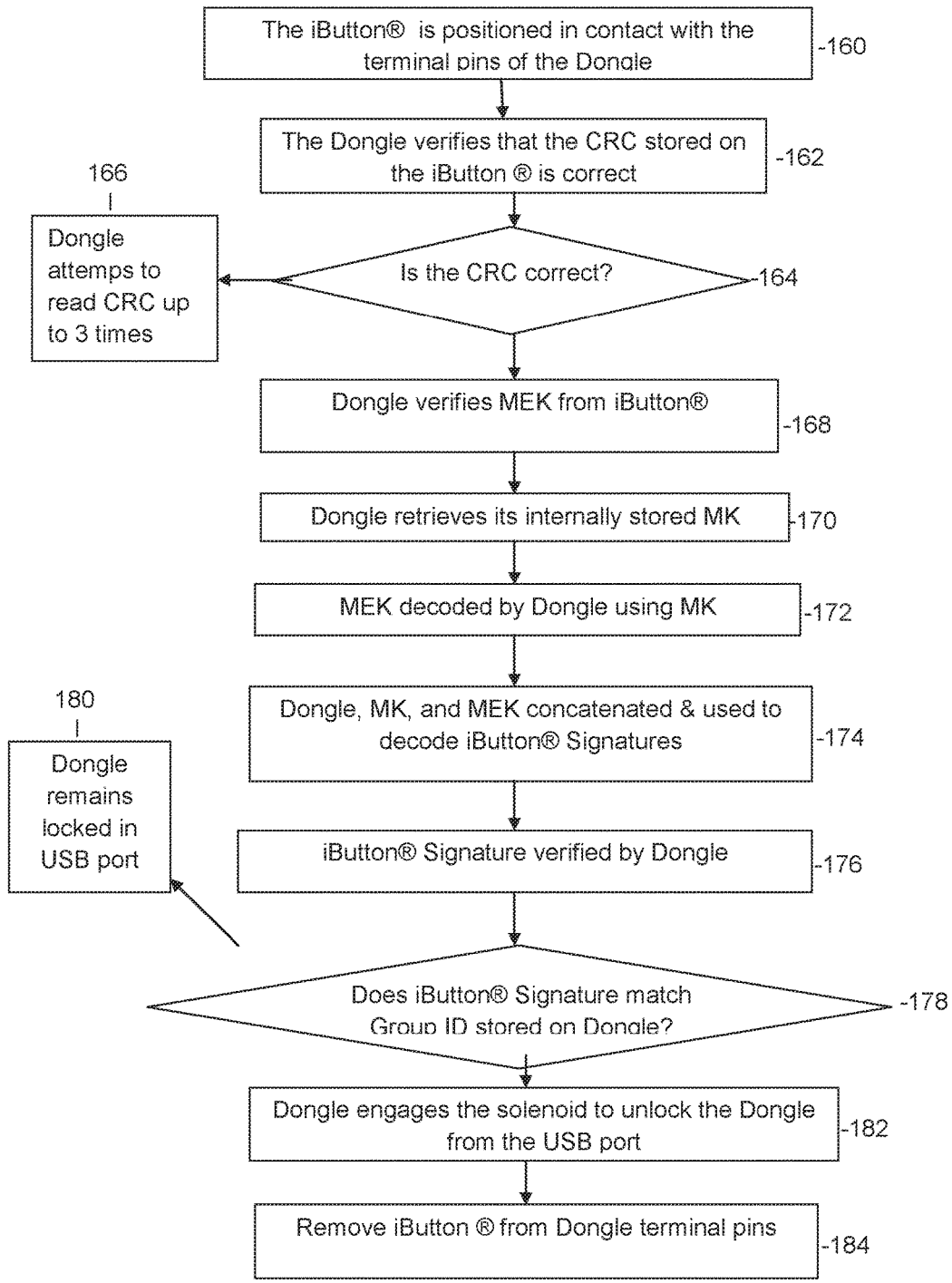
FIG. 30 is a flow chart that illustrates decoding of the iButton® 26 or electronic key device to unlock the USB locking dongle.

FIG. 30 is a flow chart depicting the steps in decoding the iButton® 26 to unlock the USB locking dongle. Upon positioning the iButton® 26 or electronic key device in contact with the terminal pins 22 of the USB locking dongle at Box 160, the USB locking dongle verifies that the cyclic redundancy check stored on the iButton® 26 is correct, Box 162. The USB locking dongle retrieves a data page of non-volatile memory from the iButton® 26 to verify that the cyclic redundancy check is correct at Box 162. If the cyclic redundancy check stored on the iButton® 26 or other electronic key device is incorrect at Box 164, then the USB locking dongle attempts to read the cyclic redundancy check up to three more times at Box 166. Prior to unlocking, the LED light 28 flashes red to indicate that the USB locking dongle can not be removed from the port. If the cyclic redundancy check can not be verified, the unlock procedure can not be initiated and the USB locking dongle remains locked in the USB port or other computer interface port plugging said port. If the cyclic redundancy check is correct Box 164, then the USB locking dongle verifies that the Memory Encode Key stored on the iButton® 26 is correct at Box 168. Next, the USB locking dongle retrieves its internally stored Master Key at Box 170 and uses the Master Key to decode the Memory Encode Key stored on the USB locking dongle at Box 172. The USB locking dongle concatenates the Master Key and the Memory Encode Key together and uses them to decrypt each signature retrieved from the iButton® 26 at Box 174. Once the iButton® 26 signature is verified by the USB locking dongle at Box 176, the USB locking dongle confirms that the iButton® 26 signature matches the Group ID stored on the USB locking dongle at Box 178. If the Group ID does not match at Box 178, then the USB locking dongle remains locked within the USB port or other computer interface port at Box 180. The LED light 28 flashes red to indicate that the USB locking dongle is in a locked position. If the signature and Group ID coded on the iButton® 26 don't match the USB locking dongle, the next signature key is decoded and verified. If no valid signature is decoded, the LED light 28 displays a red color. If the iButton® 26 signature matches the Group ID stored on the USB locking dongle at Box 178, then the solenoid within the USB locking dongle engages to unlock the USB locking dongle from the USB port at Box 182. The LED light 28 flashes green to indicate that the USB locking dongle is unlocking. The iButton® 26 or electronic key device may be removed from the terminal pins 22 of the USB locking dongle once the unlock mechanism begins within the USB locking dongle, Box 184.

We hereby claim:

1. A lock for a USB computer interface port comprising:
 a locking dongle configured for insertion into a USB computer interface port to physically block said USB computer interface port;
 one or more retaining members that engage from the rear of the locking dongle, locking into the top interior surface of the USB computer interface port locking the port;
 a communication port configured to establish a connection between the USB computer interface port lock and an external electronic device;
 wherein said external electronic device comprises a key member that stores data elements necessary to unlock the locking dongle from the USB computer interface port; and
 a central processing unit that is electrically coupled to the one or more retaining members, wherein the central processing unit activates the one or more of the retaining members when signaled by said external electronic device causing the one or more retaining members to be released from the top interior surface of the USB computer interface port unlocking the locking dongle from the USB computer interface port;
 wherein the central processing unit stores data allowing it to recognize the external electronic device and data elements for decoding said external electronic device; and
 wherein the central processing unit is electrically coupled to the one or more retaining arms via a power source, wherein the power source is configured to cause the displacement of a retractable member that causes the rotation of a chassis member, which causes the one or more retaining members to move to an unlocked position unlocking the locking dongle from the USB computer interface port.

2. The invention of claim 1 wherein one or more retaining members engage the bottom interior surface of the USB computer interface port locking the USB computer interface port.

3. The invention of claim 1 wherein said external electronic device is an iButton®.

4. The invention of claim 1 wherein the central processing unit is electrically coupled to a power source, wherein the power source is mechanically coupled to a retractable member, wherein the retractable member is coupled to a chassis member, wherein the chassis member is mechanically coupled to the one or more retaining members, wherein activation of the central processing unit causes the rotation of the chassis member, causing the one or more retaining members to disengage from the USB computer interface port.

5. The invention of claim 1 wherein the locking dongle contains one or more terminals to interact with a key member, wherein said key member includes non-volatile memory used for coding said key member.

6. The invention of claim 1 wherein the locking dongle further comprises an electrical solenoid coupled to an electromagnet configured so that the electrical solenoid energizes the electromagnet to produce a magnetic charge, wherein said magnetic charge is coupled to the movement of the one or more retaining members causing said one or more retaining members to disengage from the USB computer interface port unlocking the USB computer interface port.

7. The invention of claim 6 wherein the magnetic charge is configured to cause the rotation of one or more locking members about an axis, which is configured to cause the one or more retaining members to disengage from the USB computer interface port unlocking the locking dongle from the USB computer interface port.

8. The invention of claim 6 wherein the key member further comprises non-volatile memory for storing a key code.

9. The invention of claim 8 wherein said non-volatile memory in said key member is used to provide a key code when said key member is applied to the front of said locking dongle.

10. A method of unlocking a USB computer interface port comprising:

locking a plug into the USB computer interface port by engaging one or more retaining members from the bottom of the plug;

unlocking the plug from the computer interface port by disengaging the one or more retaining members in response to a signal sent by a central processing unit; wherein the central processing unit energizes a solenoid, wherein the energized solenoid causes a retractable member to retract, wherein the retraction of the retractable member causes rotation of a chassis member, wherein the rotation of the chassis member causes the disengagement of the one or more retaining members from the bottom of the plug releasing the plug from the USB computer interface port, and having an electronic key that signals the central processing unit to disengage the one or more retaining members.

11. The method of claim 10 wherein the retraction of the retractable member causes rotation of locking arms, and wherein the rotation of locking arms causes the disengagement of the one or more retaining members from the bottom of the plug releasing the plug from the USB computer interface port.

* * * * *